(12) United States Patent
Hirabayashi et al.

(10) Patent No.: US 8,902,702 B2
(45) Date of Patent: Dec. 2, 2014

(54) METHODS AND APPARATUS TO IMAGE SUBSURFACE FORMATION FEATURES

(75) Inventors: Nobuyasu Hirabayashi, Yokohama (JP); Kentaro Torii, Sagamihara (JP); Hiroaki Yamamoto, Kamakura (JP); Jakob Haldorsen, Nesbru (NO); Arne Voskamp, Beijing (CN)

(73) Assignee: Schlumberger Technology Corporation, Sugar Land, TX (US)

( * ) Notice: Subject to any disclaimer, the term of this patent is extended or adjusted under 35 U.S.C. 154(b) by 538 days.

(21) Appl. No.: 13/087,387

(22) Filed: Apr. 15, 2011

(65) Prior Publication Data

US 2011/0255370 A1 Oct. 20, 2011

Related U.S. Application Data

(60) Provisional application No. 61/324,759, filed on Apr. 16, 2010.

(51) Int. Cl.
*G01V 1/48* (2006.01)
*G01V 1/42* (2006.01)
*G01V 1/28* (2006.01)

(52) U.S. Cl.
CPC . *G01V 1/42* (2013.01); *G01V 1/284* (2013.01)
USPC .................... 367/31; 367/43; 367/53; 367/25

(58) Field of Classification Search
CPC ................................ G01V 1/42; G01V 1/284
USPC .......... 73/152.02, 152.17; 166/250.01, 250.1;
166/250.12; 175/50; 181/102, 104, 105;
250/256, 259, 269.1; 324/323, 338,
324/339, 343, 366, 371; 367/25, 28, 35, 37,
367/38, 47, 50, 58, 61, 73, 86, 911, 912, 31,
367/43, 53; 702/7, 11, 12
See application file for complete search history.

(56) References Cited

U.S. PATENT DOCUMENTS 5,841,734 A * 11/1998 Ritter et al. ..................... 367/35
6,002,642 A 12/1999 Krebs
(Continued)

FOREIGN PATENT DOCUMENTS

WO 2008/095289 A1 8/2008

OTHER PUBLICATIONS

Sheriff, definition of "acoustic wave" in Encyclopedic Dictionary of Exploration Geophysics, Society of Exploration Geophysicists, 1991, p. 2.*

(Continued)

*Primary Examiner* — Daniel L Murphy
(74) *Attorney, Agent, or Firm* — Daryl R. Wright; Jody DeStefanis

(57) ABSTRACT

Methods of and apparatus to image one or more subsurface formation features are disclosed. An example method includes generating acoustic waves with a transmitter and receiving the acoustic waves and acoustic data contained therein at one or more receivers. The example method also includes extracting one or more S-S, P-S or S-P reflected waveform data from the acoustic data, estimating a dip of the one or more subsurface formation features, migrating the one or more S-S, P-S or S-P reflected waveform data with the estimated dip and mapping the migrated one or more S-S, P-S or S-P reflected waveform data. In addition, the example method includes identifying one or more permeable subsurface formation features using the mapped migrated one or more S-S, P-S or S-P reflected waveform data.

24 Claims, 19 Drawing Sheets

(56) References Cited

U.S. PATENT DOCUMENTS

| | | | |
|---|---|---|---|
| 6,308,137 B1 | 10/2001 | Underhill et al. | |
| 6,541,975 B2* | 4/2003 | Strack | 324/323 |
| 7,035,165 B2 | 4/2006 | Tang | |
| 8,040,754 B1* | 10/2011 | Hardage | 367/38 |
| 8,141,633 B2* | 3/2012 | Hampton et al. | 166/250.12 |
| 8,400,874 B2* | 3/2013 | Guigne et al. | 367/61 |

OTHER PUBLICATIONS

Definition of "extract", Free Online Dictionary, http://www.thefreedictionary.com/extract, downloaded Nov. 30, 2013.*
International Search Report from the equivalent PCT patent application No. PCT/IB2011/000832 issued on Aug. 13, 2012.
Schoenberg, "Elastic wave behavior across linear slip interfaces," J. Acoust. Soc. Am. 68(5), Nov. 1980, pp. 1516-1521.

\* cited by examiner

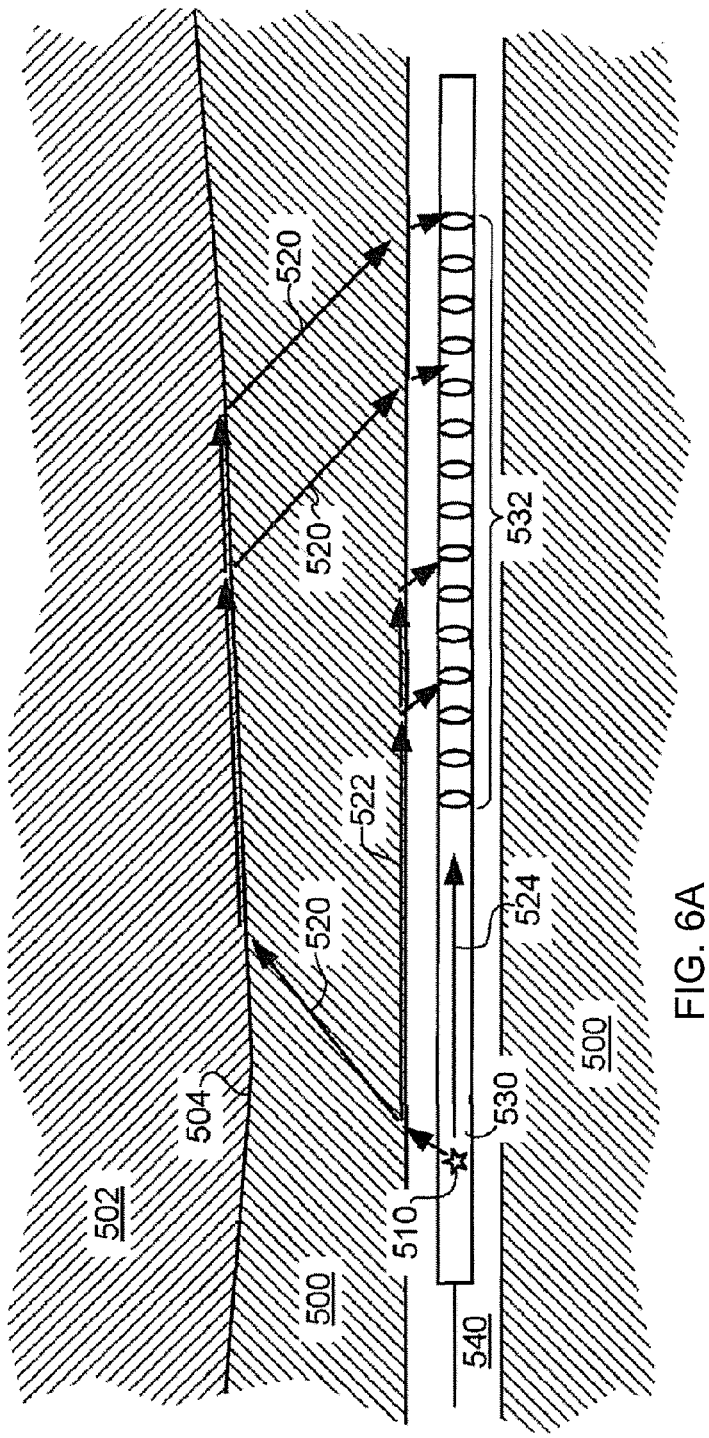
FIG. 6A
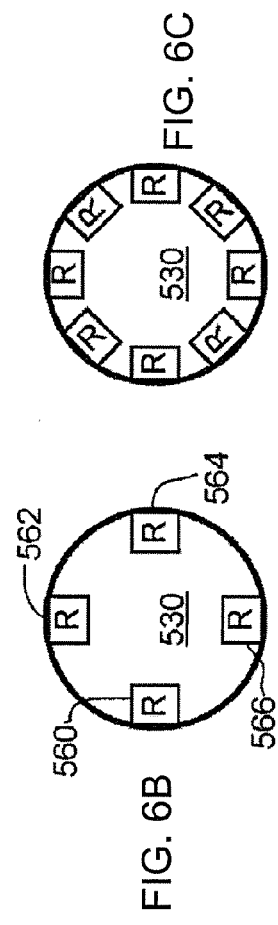
FIG. 6B
FIG. 6C

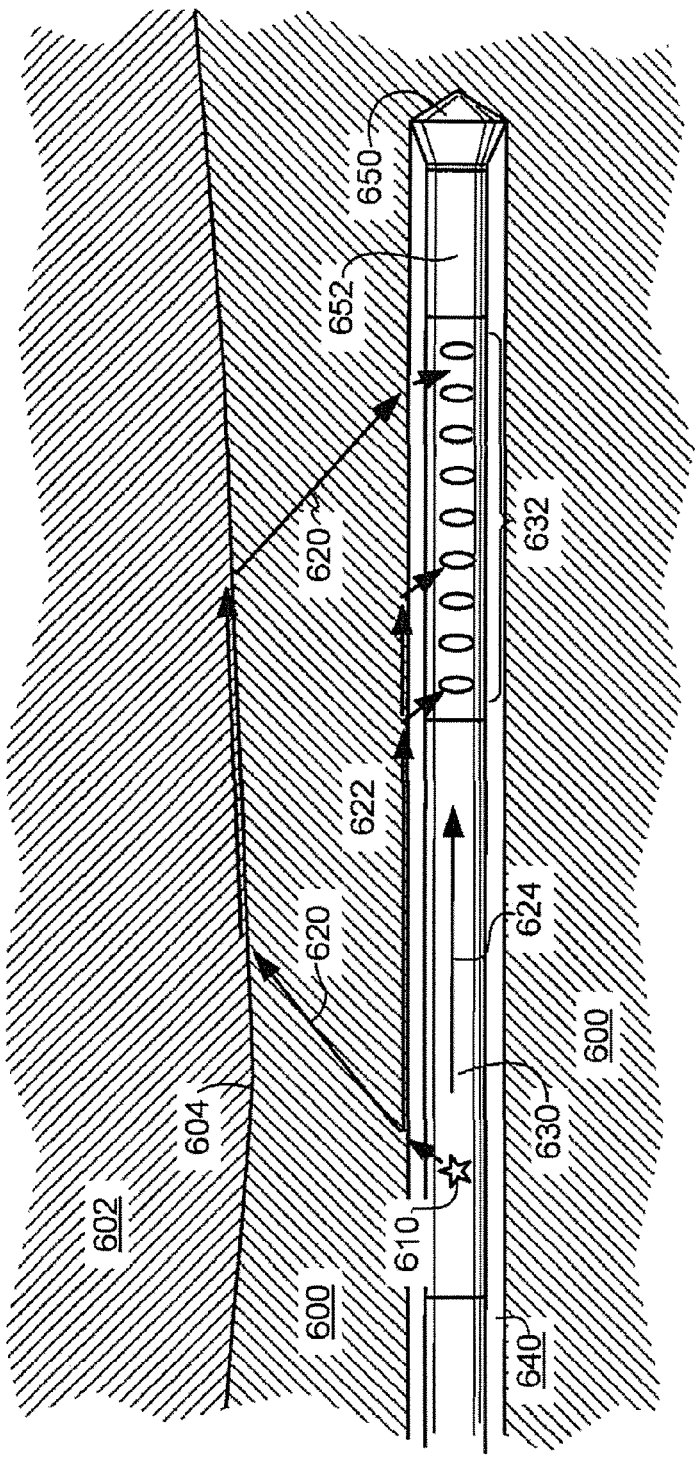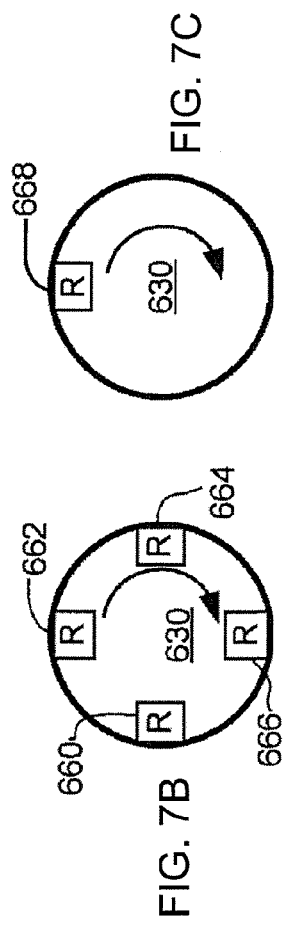
FIG. 7A
FIG. 7B
FIG. 7C

METHODS AND APPARATUS TO IMAGE SUBSURFACE FORMATION FEATURES

RELATED APPLICATION

This patent claims the benefit of U.S. Provisional Patent Application No. 61/324,759, entitled "Fracture Imaging Method Using BARS Data," which was filed on Apr. 16, 2010, and which is incorporated herein by reference in its entirety.

FIELD OF THE DISCLOSURE

This disclosure relates generally to oil and gas production and, more particularly, to methods and apparatus to image subsurface formation features.

BACKGROUND OF THE DISCLOSURE

Over the past several decades, highly sophisticated techniques have been developed for identifying and producing hydrocarbons, commonly referred to as oil and gas, from subsurface formations. These techniques facilitate the discovery, assessment, and production of hydrocarbons from subsurface formations.

Oil and gas producers typically image subterranean rock layers to determine the location and shape of the subterranean rock layers. Detection and characterization of permeable fractures are of great interest in oil exploration because they are related to the transportation and storage of hydrocarbons and, therefore, provide information that is useful to optimize production of the hydrocarbons. A resistivity tool is widely used to detect such fracture by imaging cracks on a borehole wall. Alternatively, a sonic tool can be used to find Stoneley wave reflections and transmissions that imply the existence of such open fractures. However, the foregoing types of tools and measurements are limited to vicinity of the borehole wall and, therefore, are not useful to estimate the extent of a fracture. To determine the extent of a fracture, measurements using waves that penetrate into the formation are necessary. Further, while the event signals from fractures can be evident in sonic waveforms, Borehole Acoustic Reflection Survey (BARS) (a sonic imaging service available from Schlumberger) is rarely used to detect fractures because the acoustic and elastic responses from a fracture are not well understood.

SUMMARY

An example method of imaging one or more subsurface formation features includes generating acoustic waves with a transmitter and receiving the acoustic waves and acoustic data contained therein at one or more receivers. The example method also includes extracting one or more of S-S, P-S or S-P reflected waveform data from the acoustic data, estimating a dip of one or more subsurface formation features, migrating the one or more S-S, P-S or S-P reflected waveform data with the estimated dip and mapping the migrated one or more S-S, P-S or S-P reflected waveform data. In addition, the example method includes identifying one or more permeable subsurface formation features using the mapped migrated one or more S-S, P-S or S-P reflected waveform.

In another example, an apparatus to image one or more subsurface formation features is described. The example apparatus includes one or more transmitters to generate acoustic waves and one or more receivers to sense the acoustic waves and acoustic data contained therein. In addition, the example apparatus includes a filter to extract one or more S-S, P-S or S-P reflected waveform data from the acoustic data and a processor. The processor is configured to estimate a dip of the one or more subsurface formation features, migrate the one or more S-S, P-S or S-P reflected waveform data with the estimated dip and map the migrated one or more S-S, P-S or S-P reflected waveform data. The processor is also configured to identify one or more permeable subsurface formation features based on the map of the migrated one or more S-S, P-S or S-P reflected waveform.

In still another example described herein, an example method for imaging subsurface formation features includes generating acoustic waves with a transmitter, receiving the acoustic waves at one or more depths of a borehole traversing a subsurface formation, the formation having a strike and a dip, and recording waveform data based on the acoustic waves. In the example method, one or more S-S, P-S or S-P reflected waveform data is extracted from the recorded waveform data and processed to determine an S-S, P-S and/or S-P reflection point for a feature of interest. The processing includes providing a coordinate system having a first axis along the borehole, a second axis perpendicular to the first axis and the strike, and a relative dip angle between the borehole and the dip. The processing further includes performing a migration of the one or more S-S, P-S or S-P reflected waves by using at least one of a narrow dip aperture around the relative dip angle or a common depth point transform for the relative dip angle. In addition, the example method includes imaging the subsurface formation features using the one or more S-S, P-S or S-P reflection point.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

FIG. 6A illustrates the downhole measurement of refracted energy by a tool in a borehole.

FIGS. 6B and 6C are examples of cross-sections of the tool shown in FIG. 6A.

FIG. 7A illustrates the downhole measurement of refracted energy by a LWD tool in a borehole during a drilling operation.

FIGS. 7B and 7C are cross-sectional views of the LWD tool shown in FIG. 7A.

DETAILED DESCRIPTION

Figure 1A:
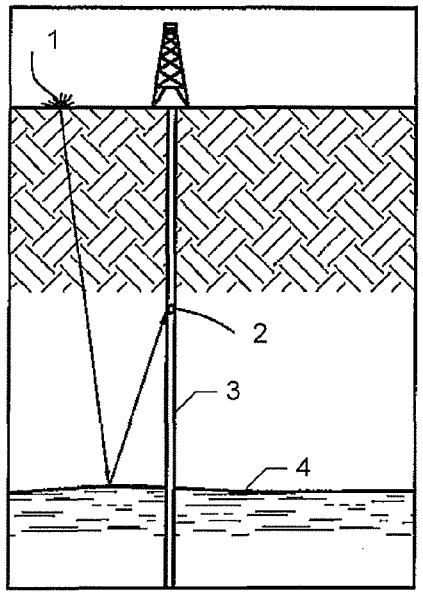
FIGS. 1A-1D show typical seismic-while-drilling tools with one or more transmitters located at the surface.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various examples and/or configurations discussed. Moreover, the formation of a first feature over or on a second feature in the description that follows may include examples in which the first and second features are formed in direct contact, and may also include examples in which additional features may be formed interposing the first and second features, such that the first and second features may not be in direct contact.

Water, oil and gas are transported through fractures in subsurface or subterranean formations, resulting in the dissolution of certain types of rocks (e.g., limestone and carbonate). In geological terms, subsurface features such as fractures have a strike and a dip, which refer to the orientation or attitude of the feature. The strike of a bed, fault or other feature, including planar features, is a line representing the intersection of that feature with a horizontal plane. The dip is the angle of descent of the feature relative to the horizontal plane. Often, the dip is taken to be perpendicular to the strike. The dissolution process creates openings or caves, known as karst caves around intersections of fractures, and the karst features are expected to follow the dip of the formation due to the contrast solubility of the rocks.

The fractures or caves that appear in a subsurface formation reflect seismic waves differently than the solid rock features or layers surrounding the fractures or caves. Two types of seismic waves are P waves and S waves. P waves or primary waves have higher velocities than S waves and, therefore, are the first to be recorded by seismic or acoustic receivers/sensors. P waves are also known as pressure waves as they are formed from alternating compressions and rarefactions. In isotropic and homogenous solids, the polarization of a P wave is longitudinal. Thus, the particles in the solid have vibrations along or parallel to the travel direction of the wave energy. S waves are secondary or shear (transverse) waves that have motion perpendicular to the direction of wave propagation. S waves travel more slowly through rock than P waves. P waves and S waves may reflect as either P waves or S waves when the waves hit a boundary of a material through which they flow. Thus, several types of waves may be recorded with seismic or acoustic receivers/sensors including direct P waves (non-reflected waves), direct S waves (non-reflected waves), P-P waves (also, "PrP"—P waves reflected as P waves), P-S waves (also, "PrS"—P waves reflected as S waves), S-P waves (also, "SrP"—S waves reflected as P waves) and S-S waves (also, "SrS"—S waves reflected as S waves).

Caves and fractures have strong S-S reflectivity because they are void or filled with water, gas and/or oil. It is possible, as described herein, to image karst caves using migration for one or more S-S, P-S or S-P reflected waves. A fracture is imaged as a set of karst caves aligned in a particular direction. The extent of the fractures and karst caves is of great interest as these features may be filled with producible hydrocarbons.

Schlumberger's BARS service may be used with the example tools and example processes described herein. In one example, one or more transmitters emit acoustic signals and one or more receivers gather or sense and record the acoustic signals including direct S and direct P waves and the various reflected waves. The acoustic data contained in the signals is filtered to extract or obtain the S-S, P-S and/or S-P reflected waveform.

Multiple processing or migration operations may be conducted with the gathered data and particularly with the S-S, P-S and/or S-P reflected waveform data as described in greater detail below. For example, a dip angle of the formation feature (e.g., fracture) is estimated based on a modeling technique such as, for example, the modeling technique discussed below and generally with respect to FIGS. 12, 13, 14A, 14B and 15 in which various dip angles are tested or evaluated to generate synthetic waveforms. The dip angle that provides the best agreement between synthetic and recorded waveforms is selected as the estimated dip angle. The S-S, P-S and/or S-P reflected waveform data is migrated using the estimated dip angle, which may ultimately reveal an S-S reflection point for a feature of interest. With the migration of the S-S, P-S and/or S-P reflected data, a coordinate system is established along a well. The established coordinate system includes a first axis in the direction of the well, a second axis perpendicular to the first axis and perpendicular to the strike of the formation feature (i.e., in the direction of the dip). A narrow angular range for the migration aperture is used around the relative angle between the formation and the well to restrict the reflection angles of the elastic waves for imaging. For example a range of 2.5 degrees to 5.0 degrees may be used. The narrow angular aperture in migration reduces smearing over the image with caves of limited size. In alternative examples, common-depth-point transform (mapping) may be used in place of the narrow-aperture migration. After the migration of the one or more S-S, P-S or S-P reflected waveform data, the S-S, P-S and/or S-P reflection point for the data is determined and may be mapped in a migration image. The culmination of multiple S-S, P-S and/or S-P reflection points establishes the extent of the caves and/or fractures.

Figure 1B:
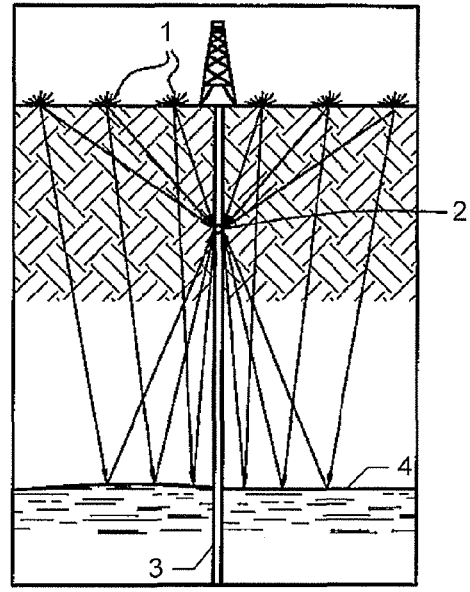
Figure 1C:
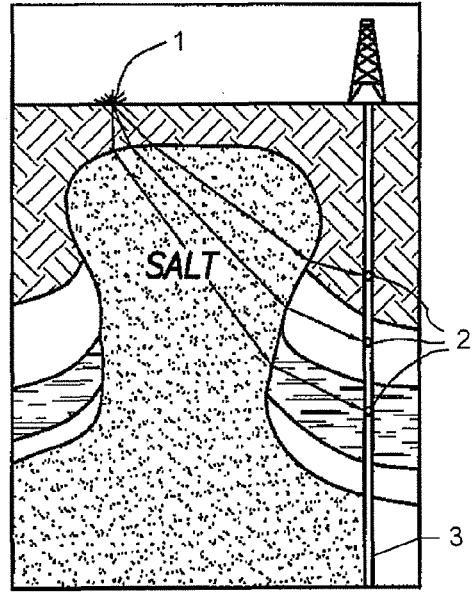
Figure 1D:
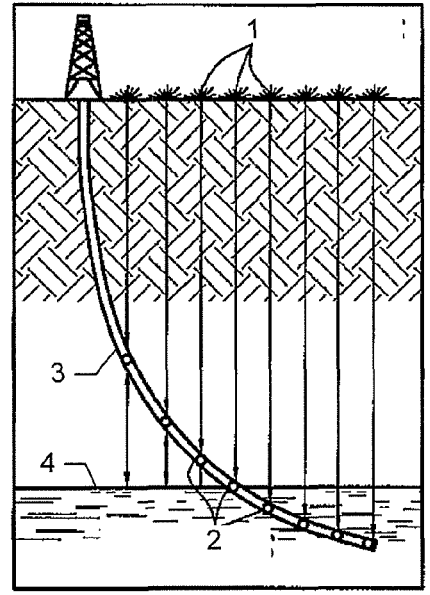

Turning now to the figures, FIGS. 1A-1D show typical seismic-while-drilling tools that include one or more transmitters 1 at the surface and one or more receivers 2 in a borehole 3. FIGS. 1A and 1B show that the downhole tool may include a single receiver 2 in the borehole 3. Additionally, FIGS. 1A and 1C show that a single transmitter 1 may be implemented as a single seismic (e.g., signal) source, while FIGS. 1B and 1D show a plurality of transmitters 1 providing respective seismic sources. FIG. 1B shows the receiver 2 receiving reflections and direct signals from the transmitters 1, while FIGS. 1C and 1D show multiple receivers 2 receiving signals directly from the one or more transmitters 1.

Seismic images may be generated from the arrangement of the transmitter(s) 1 and the receiver(s) 2 of FIGS. 1A-1D. FIG. 1A shows a reflection of the signal off a rock boundary layer or a bed boundary 4. The seismic imaging of the bed boundary generates a zero-offset vertical seismic profile arrangement. FIG. 1B shows a reflection of the signals off the bed boundary 4. This seismic imaging generates a walkway vertical seismic profile arrangement. FIG. 1C shows a refraction through salt dome boundaries. This seismic imaging generates a salt proximity vertical seismic profile. FIG. 1D includes signal reflections off the rock layer boundary 4 and/or some direct signals from the transmitter 1. This seismic imaging generates a walk above vertical seismic profile. The vertical profiles and/or arrangements referred to in FIGS. 1A-1D are labeled vertical because the receiver(s) 2 are oriented vertically along the borehole 3.

Furthermore, each receiver(s) 2 may include sensors evenly spaced around the circumference of the receiver. To determine the distance from the tool in the borehole 3 to a first portion of the boundary 4 of a rock layer, the transmitter(s) 1 transmit a first signal. This first signal propagates in all directions through the rock layer. When the signal reaches the boundary 4 of the rock layer, the signal reflects back to the borehole 3. The receiver(s) 2 may then detect the reflected signal. Similarly, a second signal may be transmitted by the transmitter(s) 1 and received by the receiver(s) 2 after reflecting off the boundary 4. The distance to the boundary 4 can be related to the time for the first signal to reach each receiver 2, the distance from each of the receiver(s) 2 to the transmitter 1, and the velocity of the first signal. There may be a separate time-distance relationship for each sensor within the receiver 2 that receives the reflected first signal. Similarly, the time for the second signal to reach each of the receivers 2, the distance from the receivers 2 to the transmitter(s) 1, and the velocity of the signal can be related to the distance to the boundary 4. These relationships may then be combined into a semblance model to calculate the distance to a portion of the boundary 4.

Figure 2:
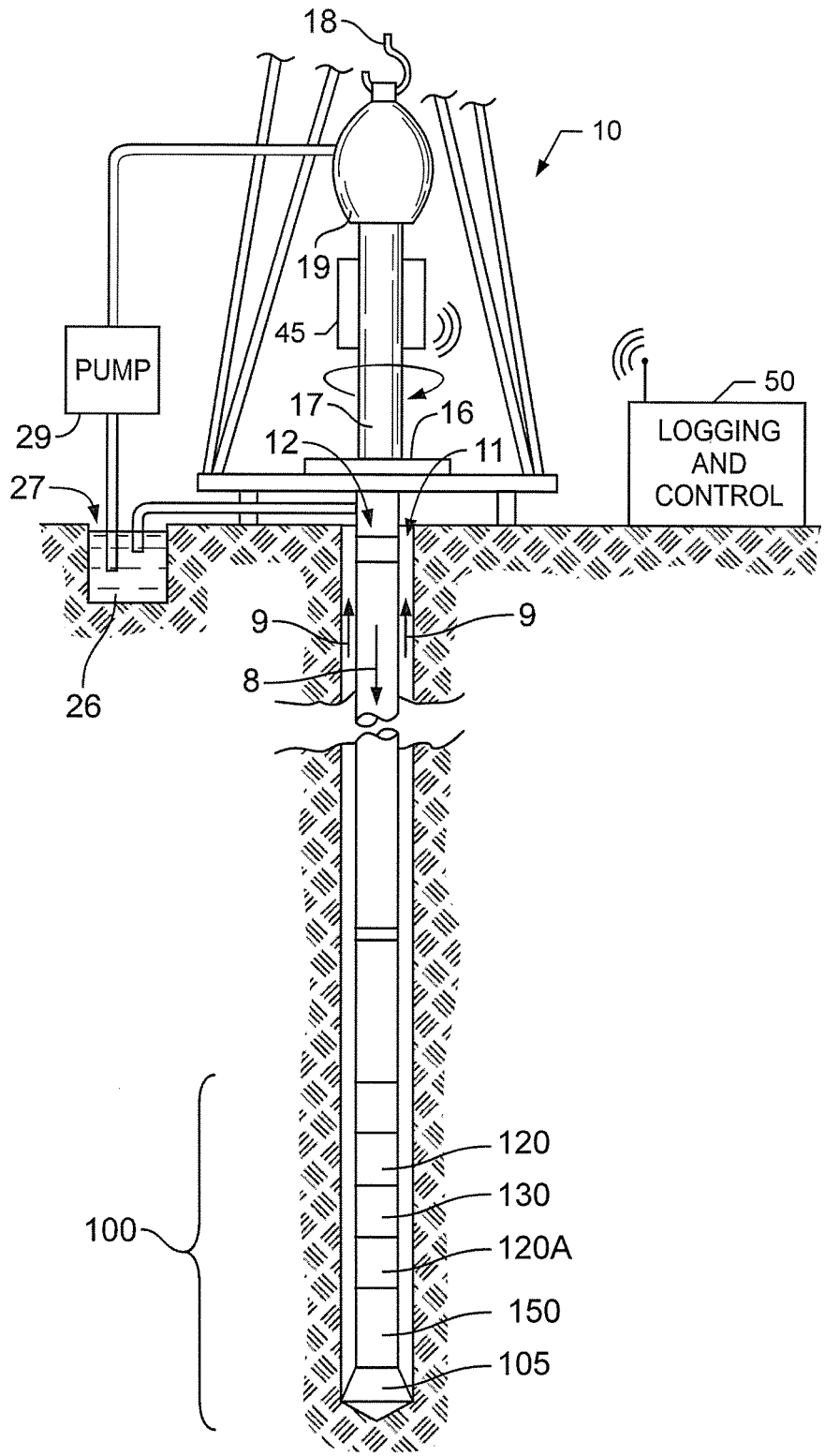
FIG. 2 illustrates a wellsite system in which the present invention can be employed.

FIG. 2 illustrates a wellsite system in which the present examples can be employed. The wellsite can be onshore or offshore. In this exemplary system, a borehole 11 is formed in subsurface formations by rotary drilling in a manner that is well known. The examples described herein may also use directional drilling, as will be described hereinafter.

A drill string 12 is suspended within the borehole 11 and has a bottomhole assembly 100 which includes a drill bit 105 at its lower end. The surface system includes platform and derrick assembly 10 positioned over the borehole 11, the assembly 10 including a rotary table 16, kelly 17, hook 18 and rotary swivel 19. The drill string 12 is rotated by the rotary table 16, energized by means not shown, which engages the kelly 17 at the upper end of the drill string. The drill string 12 is suspended from the hook 18, attached to a traveling block (also not shown), through the kelly 17 and the rotary swivel 19 which permits rotation of the drill string 12 relative to the hook 18. As is well known, a top drive system could alternatively be used.

In this example, the surface system further includes drilling fluid or mud 26 stored in a pit 27 formed at the well site. A pump 29 delivers the drilling fluid 26 to the interior of the drill string 12 via a port in the swivel 19, causing the drilling fluid to flow downwardly through the drill string 12 as indicated by the directional arrow 8. The drilling fluid exits the drill string 12 via ports in the drill bit 105, and then circulates upwardly through the annulus region between the outside of the drill string and the wall of the borehole, as indicated by the directional arrows 9. The drilling fluid lubricates the drill bit 105 and carries formation cuttings up to the surface as it is returned to the pit 27 for recirculation.

Additionally, the wellsite system includes a communications relay 45 and a logging and control processor 50. The example communications relay 45 may receive information and/or data from sensors, transmitters and/or receivers located within the bottomhole assembly 100. The information may be received by the communications relay 45 via a wired communication path through the drillstring 12 and/or via a wireless communication path. The communications relay 45 transmits the received information and/or data to the logging and control processor 50. Additionally, the communications relay 45 may receive data and/or information from the logging control processor 50. Upon receiving the data and/or information, the communications relay 45 may forward the data and/or information to the appropriate sensor(s), transmitter(s) and/or receiver(s) within the bottomhole assembly 100.

The example logging and control processor 50 may include a user interface that enables parameters to be input and/or outputs to be displayed. Additionally, the logging and control processor 50 may control imaging of a fractures or caves (e.g., karst caves) in a subterranean formation. For example, the logging and control processor 50 may position the bottomhole assembly 100 and/or a sonic and/or seismic imaging tool within the borehole 11, instruct transmitters to transmit a signal for receivers and/or sensors to receive.

Additionally, the logging and control processor 50 may calculate a distance from the borehole 11 to a portion of a fracture and/or cave (e.g., an S-S reflection point) based on the transmitted and received signal. While the logging and control processor 50 is depicted uphole at the surface and within the wellsite system, a portion or the entire logging and control processor 50 may be positioned in the bottomhole assembly 100 and/or in a remote location. The logging and control processor 50 is described in greater detail in conjunction with FIG. 9.

The bottomhole assembly 100 of the illustrated example includes a logging-while-drilling (LWD) module 120, a measuring-while-drilling (MWD) module 130, a roto-steerable system and motor 150, and drill bit 105.

The LWD module 120 is housed in a special type of drill collar and can contain one or a plurality of logging tools. Further, more than one LWD and/or MWD module can be employed, e.g. as represented at 120A. (References, throughout, to a module at the position of 120 can alternatively mean a module at the position of 120A as well). The LWD module 120 includes capabilities for measuring, processing, and storing information, as well as for communicating with the surface equipment. In this example, the LWD module 120 includes both pressure and sonic measuring devices.

A MWD module 130 is also housed in a special type of drill collar and can contain one or more devices for measuring characteristics of the drill string and drill bit. The MWD tool 130 further includes an apparatus (not shown) for generating electrical power to the downhole system. This may typically include a mud turbine generator powered by the flow of the drilling fluid, it being understood that other power and/or battery systems may be employed. In this example, the MWD module 130 includes one or more of the following types of measuring devices: a weight-on-bit measuring device, a torque measuring device, a vibration measuring device, a shock measuring device, a stick slip measuring device, a direction measuring device, and an inclination measuring device.

A particularly advantageous use of the system hereof is in conjunction with controlled steering or directional drilling. In this example, a roto-steerable subsystem 150 (FIG. 2) is provided. Directional drilling is the intentional deviation of the wellbore from the path it would naturally take. In other words, directional drilling is the steering of the drill string so that it travels in a desired direction. Directional drilling is, for example, advantageous in offshore drilling because it enables many wells to be drilled from a single platform. Directional drilling also enables horizontal drilling through a reservoir or cave. Horizontal drilling enables a longer length of the wellbore to traverse the reservoir, which increases the production rate from the well. A directional drilling system may also be used in vertical drilling operations as well. Often, the drill bit will veer off of a planned drilling trajectory because of the unpredictable nature of the formations being penetrated or the varying forces that the drill bit experiences or the geology may not be where it is expected to be. When such a deviation occurs, a directional drilling system may be used to put the drill bit back on course.

Figure 3:
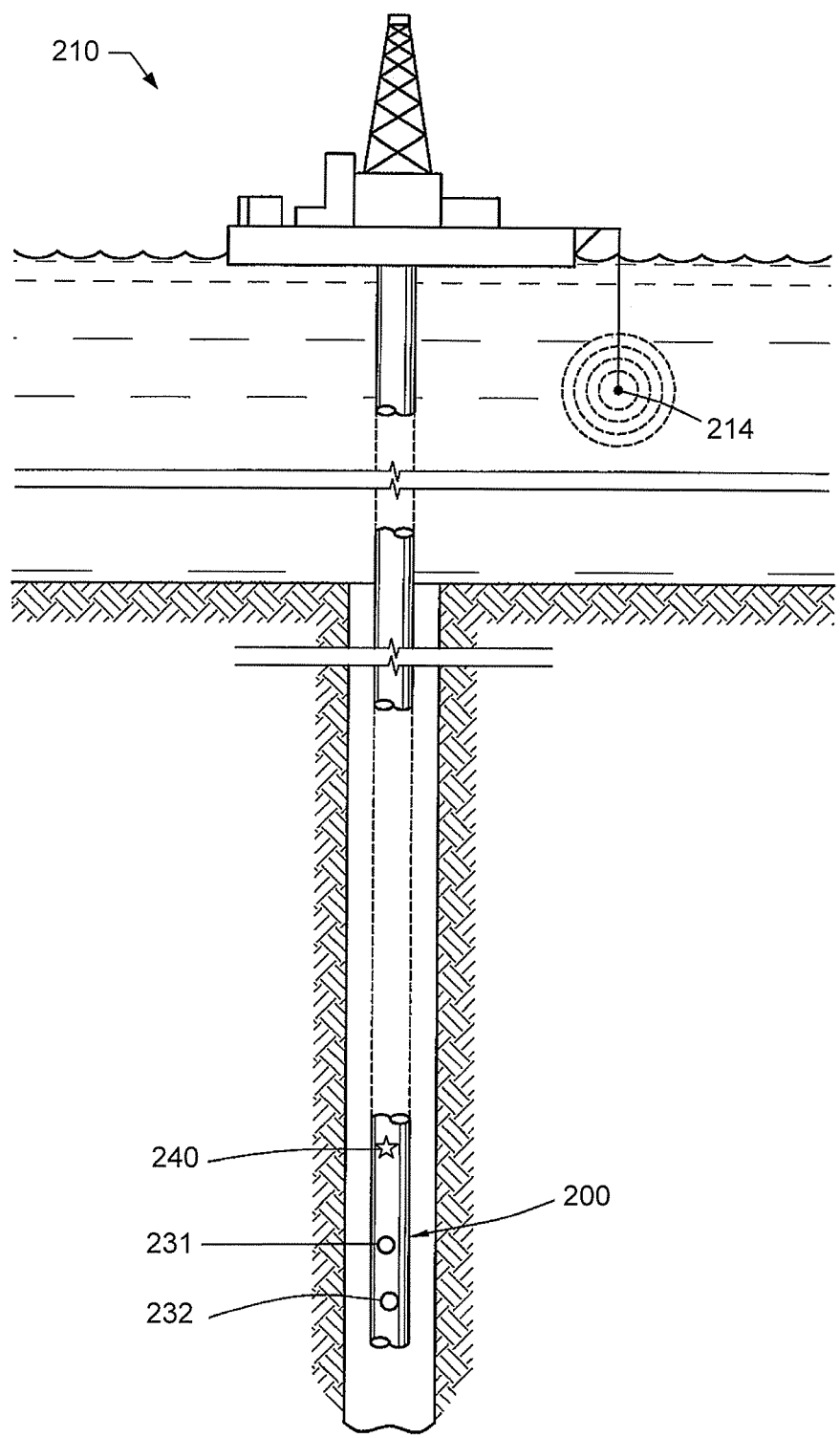
FIG. 3 illustrates a sonic logging-while-drilling tool.

FIG. 3 illustrates a seismic logging-while-drilling tool which can be the LWD tool 120, or can be a part of an LWD tool suite 120A of the type described in U.S. Pat. No. 6,308, 137, incorporated herein by reference in its entirety. In the example shown in FIG. 3, an offshore rig 210 is employed, and a seismic transmitting source or array 214 is deployed near the surface of the water. Alternatively, any other suitable type of uphole or downhole source or transmitter can be provided. An uphole processor controls the firing of the transmitter 214. The uphole equipment can also include acoustic receivers and a recorder for capturing reference signals near the source. The uphole equipment further includes telemetry equipment for receiving MWD signals from the downhole equipment. The telemetry equipment and the recorder are typically coupled to a processor so that recordings may be synchronized using uphole and downhole clocks. The downhole LWD module 200 includes at least acoustic receivers 231 and 232, which are coupled to a signal processor so that recordings may be made of signals detected by the receivers in synchronization with the firing of the signal source. Alternatively, a downhole acoustic source 240 can be provided as is further described herein.

Figure 4:
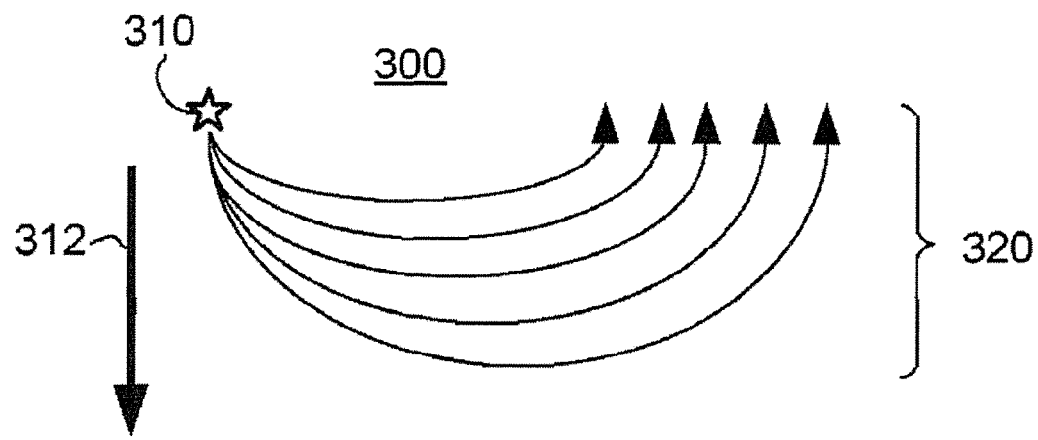
FIG. 4 illustrates the mechanism of refraction in a gradually changing medium.

Energy waves can be returned back towards a tool or other source though the mechanism of refraction. FIG. 4 illustrates the mechanism of refraction in a gradually changing medium. Medium 300 has a gradually and continuously increasing velocity profile in the direction of arrow 312. Acoustic source 310 emits acoustic energy along ray paths 320. Because the medium velocity is gradually increasing, the ray paths are curved as shown in FIG. 4. However, in many downhole situations the velocity profile is not gradually increasing but, rather there is a distinct interface.

Figure 5:
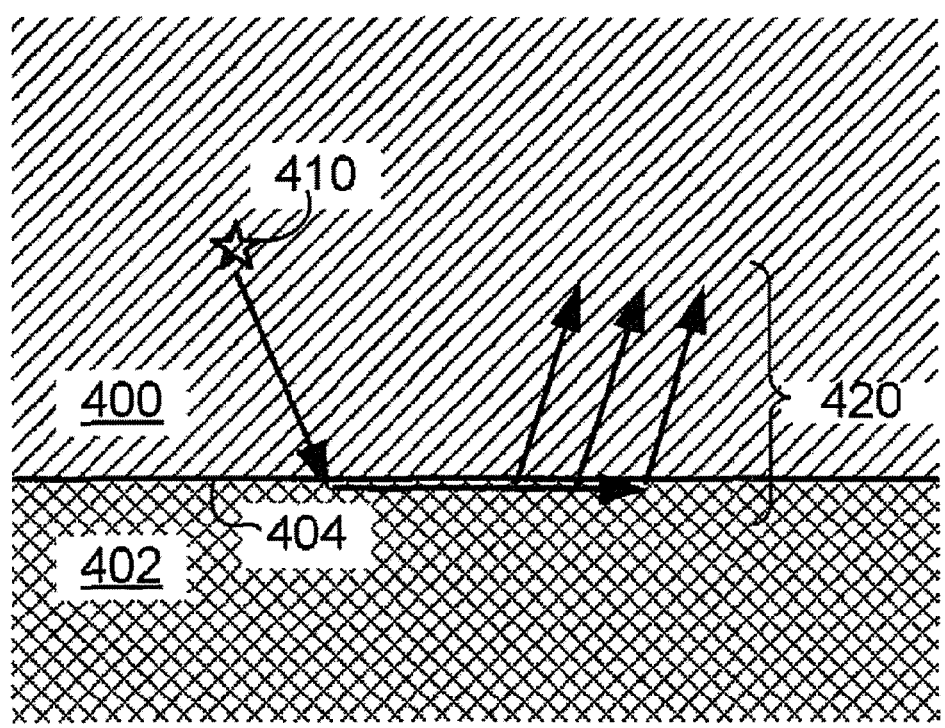
FIG. 5 illustrates the mechanism of refraction in the case of a nearby interface.

FIG. 5 illustrates the mechanism of refraction in the case of a nearby interface. Medium 400 has lower velocity than medium 402, the two media being separated by an interface 404. Due to the interface 404, energy from source 410 travels along the interface 404 in the form of headwaves, as shown by ray paths 420. Thus, where a well sits in the lower velocity medium and a higher velocity medium lies very nearby, this model of refracted energy can be used to analyze the data.

FIG. 6A illustrates the downhole measurement of refracted energy by a tool in a borehole. Borehole 540 lies entirely within subterranean rock formation 500 having a first propagation velocity $v_1$. A nearby rock formation 502 has a propagation velocity $v_2$ and is separated from formation 500 by interface 504. Furthermore, in this example, $v_2 > v_1$. Tool 530 lies within borehole 540. The tool 530 can be a wireline deployed tool, or it can be deployed via different means such as via coiled tubing, or on a drill collar during a drilling operation. Acoustic source 510 is disposed on tool 530 as shown and generates acoustic energy. The acoustic energy travels along several ray paths corresponding to different propagation modes. The tool mode propagates along the body of the tool as shown by ray path 524. A compressional headwave propagates along the borehole wall, as shown by ray path 522. The energy refracted by interface 504 travels along through formation 500 towards interface 504, along interface 504 and then back through formation 500 towards a receiver array 532 as shown by ray paths 520.

As shown in FIG. 6A, when another formation with a higher compressional velocity is located close to the borehole, an additional headwave is generated on the interface between the two formations. For receivers close to the source, the headwave on the borehole wall arrives first. However it has been found that at greater source-receiver separations the headwave propagating along the interface between formations is detected first. The arrival time and moveout across the array can be analyzed to determine the distance from the borehole to the boundary 504 between the formations.

FIGS. 6B and 6C are example cross-sectional views of the tool shown in FIG. 6a. In FIG. 6b, four receivers 560, 562, 564 and 566 are located at each receiver station, thereby giving azimuthal resolution to the refracted acoustic energy data. FIG. 6C shows an arrangement of eight azimuthally distributed receivers for each receiver station in the array 532 (as shown in FIG. 6A), thereby providing greater azimuthal resolution.

FIG. 7A illustrates the downhole measurement of refracted energy by an LWD tool in a borehole during a drilling operation. Borehole 640 lies entirely within subterranean rock formation 600 having a first propagation velocity $v_1$. A nearby rock formation 602 has a propagation velocity $v_2$ and is separated from formation 600 by interface 604. As in the example of FIG. 6A, in this example $v_2 > v_1$. Bottom hole assembly 630 lies within the borehole 640 and includes drill bit 650 and roto-steerable subsystem 652. The roto-steerable subsystem 652 provides directional drilling and geosteering in response to analysis of the refracted energy measurements. Alternatively, the subsystem 652 could include a mud motor and bent sub to provide directional drilling capability. Acoustic source 610 is disposed on the assembly 630 as shown and generates acoustic energy. The acoustic energy travels along several ray paths corresponding to different propagation modes. The tool mode propagates along the body of the tool as shown by ray path 624. A compressional headwave propagates along the borehole wall, as shown by ray path 622. The energy refracted by the interface 604 travels along through formation 600 towards the interface 604, along the interface 604 and then back through the formation 600 towards a receiver array 632 as shown by ray paths 620. Although the receiver array 632 is shown closer to the drill bit 650 than the source 610, in an alternative example, the receiver array 632 is positioned farther away from the drill bit 650 than the source 610 to reduce the amount of noise received from the drill bit 650.

FIGS. 7B and 7C are examples of cross-sections of the LWD tool shown in FIG. 7a. In FIG. 7b, four receivers 660, 662, 664 and 666 are located at each receiver station, thereby giving azimuthal resolution to the refracted acoustic energy data. However, due to the rotation of the drill collar during a drilling operation, additional azimuthal resolution can be obtained by making measurements while the collar is rotated to different positions. For example, FIG. 7C shows an arrangement including only a single receiver for each receiver station. Azimuthal resolution is provided by making measurements at different rotational positions of the drill collar.

Figure 8:
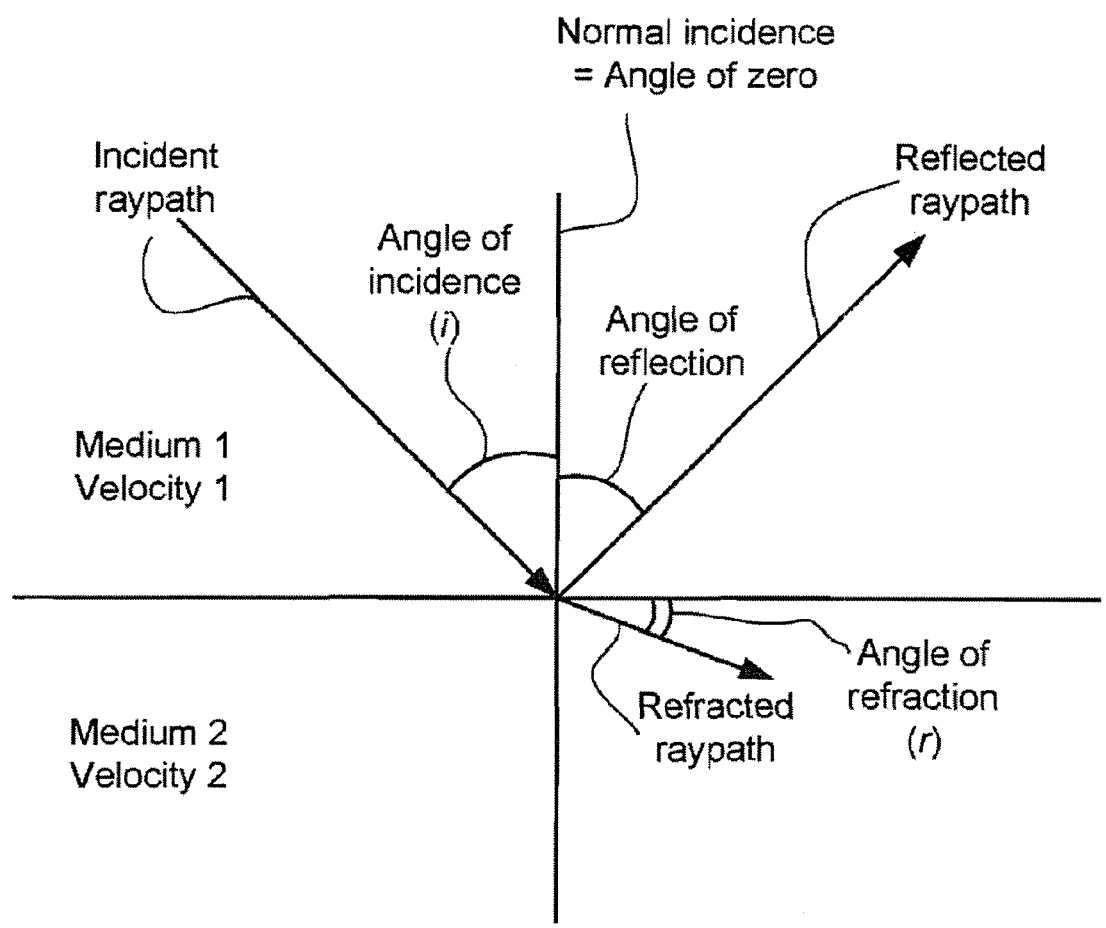
FIG. 8 provides a basic illustration of Snell's law.

Refraction refers to the change in the direction of travel of a wavefront, or the bending of a ray, as it passes from one medium to another, expressed mathematically by Snell's law. FIG. 8 provides a basic illustration of Snell's law. Snell's Law is given in Equation (1).

$$\sin i/v_1 = \sin r/v_2 \tag{1}$$

Here i and r are the incident and refracted angles as shown in FIG. 8, and $v_1$ and $v_2$ correspond to the velocities of the layers Medium 1 and Medium 2 shown in FIG. 8. FIG. 8 may also illustrate the law of reflection. The law of reflection is that the incident ray, the reflected ray and the normal to the reflection surface at the point of the incidence lie in the same plane, and the angle that the incident ray makes with the normal is equal to the angle which the reflected ray makes to the same normal.

Figure 9:
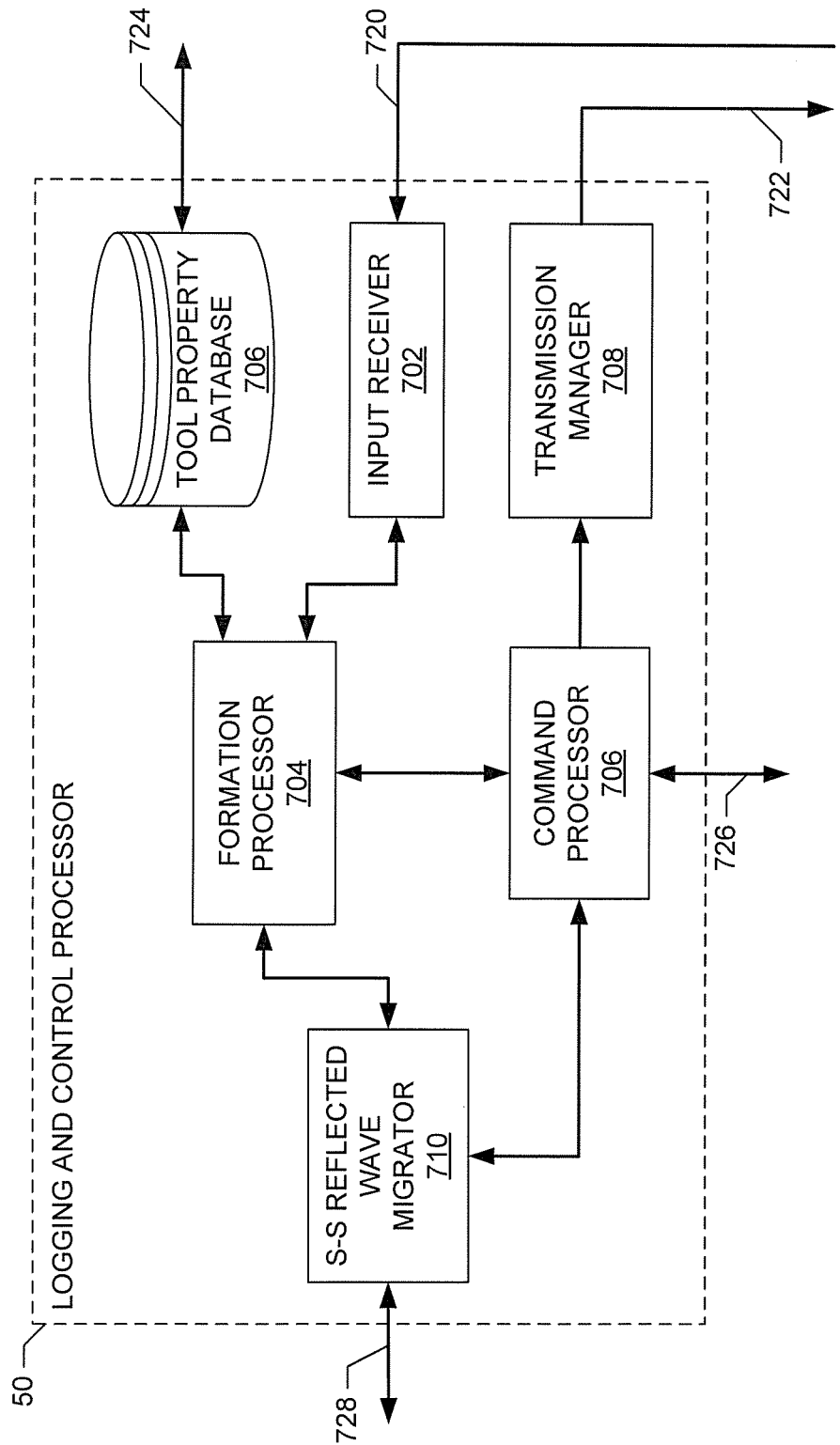
FIG. 9 shows an example functional block diagram of the logging and control processor of FIG. 2.

FIG. 9 shows an example functional diagram of the logging and control processor 50 of FIG. 2. The example logging and control processor 50 sends transmission instructions to a tool (e.g., the example tool 530 of FIG. 6A, the LWD modules 120 and 120A and/or MWD module 130 of FIG. 2) and processes received signals and/or messages from the tool to calculate the location and shape of a fracture and/or cave (e.g., a karst cave) in a subterranean formation. Additionally, the logging and control processor 50 may use signal migration and/or semblance processing of S-S reflected waveforms to image the fracture and/or cave.

To receive signals and/or messages from sensors and/or receivers within the tool, the example logging and control processor 50 includes an input receiver 702. The example input receiver 702 receives the signals and/or messages via a communication path 720 that may be communicatively coupled to the tool that includes the transmitters, receivers and/or sensors. The communication path 720 may include any wired communication path(s) and/or any wireless communication path(s).

The input receiver 702 may receive signals and/or messages by polling each of the receivers and/or sensors for any received signal data that may have been accumulated or collected by the receivers and/or sensors. Alternatively, the input receiver 702 may receive the signals and/or messages or, generally, information or data from the sensors and/or the receivers upon those sensors and/or receivers detecting a signal portion (e.g., a portion of the signal 520, 522 of FIG. 6A). Upon receiving the signals and/or messages, the example input receiver 702 may queue the information or data associated with the signals and/or messages until a formation processor 704 is available to process the information. Alternatively, the input receiver 702 may parse the received messages for information included within the messages including the identity of the receiver and/or sensor that detected the signal portion and transmitted the message, the time a signal was detected and/or any other data included within the signal that was detected. Upon parsing this information, the input receiver 702 may forward the parsed information to a formation processor 704 for processing. In yet another example, the input processor 702 may buffer the received messages until the input processor 702 receives a request for data from the formation processor 704. Upon receiving the request, the input receiver 702 may forward the data or information included within the received signals and/or messages and/or the received messages to the formation processor 704.

To image a fracture and/or cave in a subterranean environment, the example logging and control processor 50 of FIG. 9 includes the formation processor 704. The example formation processor 704 receives messages and/or data included within the received signals and/or messages from the input receiver 702. The example formation processor 704 then matches those messages and/or data with the data associated with the transmission of the corresponding signal. The data associated with transmitting the signal may include a time the signal was transmitted from a transmitter (e.g., a timestamp), the signal type and/or any other data included within the signal.

By matching the received messages to the transmitted signals and/or message data, the formation processor 704 can calculate the inline velocity of the signal and determine the time period elapsed for each signal portion to propagate from the transmitter to the corresponding sensor and/or receiver. The formation processor 704 calculates the propagation time by subtracting the time at which a portion of the signal was received by a sensor and/or receiver from the time at which the signal was transmitted. Additionally, the example formation processor 704 may calculate the inline signal velocity by determining a first instance or occurrence for a received signal and/or message from a receiver, calculating the time period for the signal to propagate from the transmitter to the receiver and/or sensor, and dividing the distance between the transmitter and the receiver by the time period. Further, the example formation processor 704 may calculate the inline signal velocity by using semblance analysis of the signal traveling along receivers within the seismic and/or sonic tool.

The first instance of the received signal and/or message is generally a portion of the signal traveling in the direction along the tool (i.e., inline) because this is the shortest distance for the signal to travel. Subsequent instances or occurrences of the receiver receiving portions of the signal are generally from reflections off the formation surfaces (e.g., fractures and/or caves) and back to the tool, which involves a greater distance than the distance directly from the transmitter to the receiver.

The example formation processor 704 may determine distances between each transmitter and receiver and/or sensor by accessing a tool property database 706. For example, if the formation processor 704 processes a received signal or message that indicates that the signal portion was received by a sensor with an identification value of DM01, the formation processor 704 may access the database 706 to determine that the sensor DM01 has a location that is two meters from the transmitter.

Upon calculating the time periods, the example formation processor 704 may generate an equation, a mathematical relationship and/or the time-distance velocity relationship for each receiver and/or sensor that relates a distance to a portion of a fracture and/or cave (e.g., an S-S reflection point) to a propagation time of the signal, a distance of the receiver from the transmitter, the inline velocity of the signal and/or the reflected/refracted velocity of the signal portion received.

The example formation processor 704 may determine that additional data is needed to calculate a distance to a fracture and/or cave feature of the subterranean formation. In these cases, the formation processor 704 may send a message to a command processor 706 to instruct a transmitter to transmit another signal. Upon receiving this message, the command processor 706 may instruct a transmission manager 708 to instruct a transmitter to transmit a signal. The instructions may include a time to transmit the signal and/or a signal type (e.g., signal frequency, signal amplitude, signal duration, etc.).

The formation processor 704 may utilize a plurality of equations to determine the angle of propagation for each signal portion to determine the velocity and the distance to a portion of the fracture and/or cave. The formation processor 704 may utilize any best fit model, least squares best fit model, a variance minimization best fit model, and/or any other best fit model. Alternatively, the formation processor 704 may organize the equations into a matrix or system of equations to model and/or determine the distance to a portion of the fracture and/or cave. Furthermore, because the points of reflection of the signal portions are some distance apart, the formation processor 704 may determine a distance from each point of reflection at a portion of the fracture and/or cave to an orthogonal point in the tool.

Upon calculating the distance(s) from the tool to the portion of the fracture and/or cave being imaged or measured, the formation processor 704 forwards these distance(s) to an S-S waveform migrator 710. The example S-S waveform migrator 710 determines distances between the calculated distances between the tool and the portion of the fracture/cave to generate a continuous fracture/cave for imaging (including a plurality of S-S reflection points). For example, if the S-S waveform migrator 710 receives the distance to one or more reflection points from the formation processor 704, the S-S waveform migrator 710 determines the distances from between the points to the tool. The example S-S waveform migrator 710 determines these distances using migration processing that estimates the distances to the fracture/cave between the reflection points based on the measured or calculated distances associated with the points. Though the term "S-S waveform migrator" is used in this description, the migrator may process other waveforms including, for example P-S and S-P waveforms and related reflection points.

Additionally, the example S-S waveform migrator 710 of FIG. 9 may store the calculated distances to a database. Then, as the tool moves within the borehole to determine distances to (i.e., to image) other portions of the fractures/caves, the S-S waveform migrator 710 migrates (e.g., interpolates) the distances to the fracture/cave between the measurement locations of the tool. For example, if there is a seven foot spacing between measurement locations of the tool, the S-S waveform migrator 710 may estimate the fracture/cave between these points based on the calculated distances. As a result of the migration processing, the S-S waveform migrator 710 generates a continuous fracture/cave image for portions of the subterranean formation that have been measured.

The example S-S waveform migrator 710 may also create images from the calculated and/or estimated distances of the fracture/caves. These images may show the rock layer shape, depth, boundary and/or any other information that may be determined from the calculated distances. The example S-S waveform migrator 710 may transmit the images, the calculated distances and/or the estimated distances to an operator via a communication path 728.

The example logging and control processor 50 includes the command processor 706 to manage the activities and/or functions of the formation processor 704, the S-S waveform migrator 710, and/or the transmission manager 708. The command processor 706 may receive commands from an oil and/or gas producer operator via a communication path 726. The operator may send instructions to the command processor 706 to initiate imaging of a fracture/cave to initiate image processing of a fracture/cave, and/or to determine an operating efficiency of the formation processor 704. Additionally, an operator may transmit an image profile to the example command processor 706 to specify locations within a borehole that a tool is to image and/or measure. The command processor 706 may then manage the timing of the transmission of signals and the processing of the received data via the formation processor 704 to ensure a fracture/cave is measured and/or imaged according to the image profile. Additionally, the command processor 706 may instruct the movement of the tool.

To manage the generation and transmission of commands to transmitters, sensors, and/or receivers included within the tool, the example logging and control processor 50 of FIG. 9 includes the transmission manager 708. Upon receiving an instruction to transmit a signal, the transmission manager 708 determines which transmitter is to transmit the signal, a time at which the signal is to be transmitted, the type of signal to be transmitted, and/or any signal properties of the signal to be transmitted. The example transmission manager 708 then sends a transmission message to the corresponding transmitter included within the tool via a communication path 722. The communication path 722 may include any wired and/or wireless communication path(s).

The transmission message may include the signal type the transmitter is to transmit, a duration for the transmission of the signal (e.g., I second), a time at which the signal is to be transmitted, and/or signal properties (e.g., amplitude, frequency, etc.). Alternatively, the transmission manager 708 may send a transmission message to the appropriate transmitter at the time the transmitter is to transmit a signal. Upon receiving the message, the transmitter may then transmit the specified signal. Additionally, the transmission manager 708 may send a transmission message to the receivers and/or sensors to alert the receivers and/or sensors that a signal will be transmitted. This alert may activate the sensors and/or receivers and/or may provide to the sensors and/or receivers the time at which the signal will be transmitted.

The example tool property database 706 stores known properties of the tool, including distances between transmitters, receivers and/or sensors and/or locations of the sensors around a circumference of the tool. The database 706 may also store the angle of orientation for each of the sensors and/or the signal type(s) that the transmitters are configured to output. Furthermore, the database 706 may store identification information for each of the transmitters, receivers, and/or sensors. The data within the database 706 may be updated, added to, deleted, and/or modified by an operator via a communication path 724. For example, an operator may modify distances between receives and transmitters after a redesign or reconfiguration of the tool. The tool property database 706 may be implemented by random access memory (RAM), read-only memory (ROM), a programmable ROM (PROM), an electronically-programmable ROM (EPROM), an electronically-erasable PROM (EEPROM), and/or any other type of memory.

While an example manner of implementing the logging and control processor 50 is depicted in FIG. 9, one or more of the interfaces, data structures, elements, processes and/or devices illustrated in FIG. 9 may be combined, divided, rearranged, omitted, eliminated and/or implemented in any other way. For example, the example input receiver 702, the example formation processor 704, the example command processor 706, the example transmission manager 708, and/or the example S-S waveform migrator 710 illustrated in FIG. 9 may be implemented separately and/or in any combination using, for example, machine-accessible or readable instructions executed by one or more computing devices and/or computing platforms (e.g., the example computing system 1900 of FIG. 20).

Further, the example input receiver 702, the example formation processor 704, the example command processor 706, the example transmission manager 708, the example S-S waveform migrator 710 and/or, more generally, the example logging and control processor 50 may be implemented by hardware, software, firmware and/or any combination of hardware, software and/or firmware. Thus, for example, any of the example input receiver 702, the example formation processor 704, the example command processor 706, the example transmission manager 708, the example S-S waveform migrator 710 and/or, more generally, the example logging and control processor 50 can be implemented by one or more circuit(s), programmable processor(s), application specific integrated circuit(s) (ASIC(s)), programmable logic device(s) (PLD(s)) and/or field programmable logic device(s) (FPLD(s)), etc.

Figure 10:
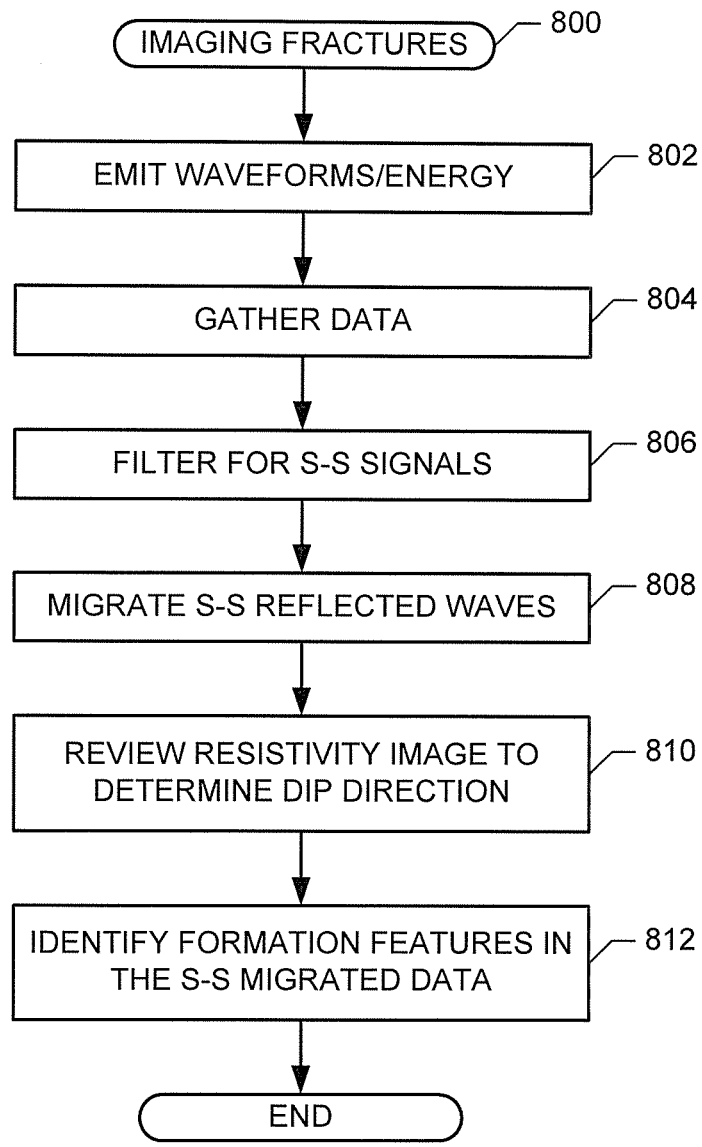
FIGS. 10 and 11 are flow charts of example processes that may be used to implement the example logging and control processor, the transmitters, the receivers, the example formation processor, the example S-S reflected waveform migrator, the example command processor and/or the example transmission manager of FIGS. 2 and 9.
Figure 11:
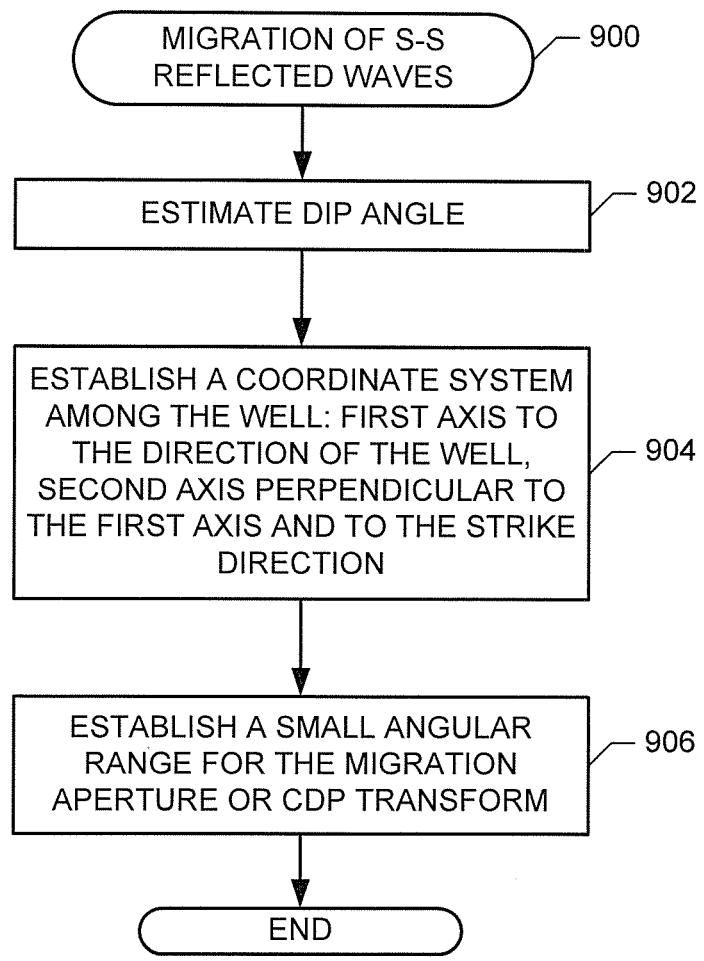

FIGS. 10 and 11 are flowcharts depicting example processes that may be carried out to implement the example logging and control processor 50, the example seismic imaging tool 502, the example transmitters 510, 610, the example receivers 560, 562, 564, 566, 660, 662, 664, 666, 668, the example formation processor 704, the example S-S waveform migrator 710, the example command processor 706, and/or the transmission manager 708 of FIGS. 2, 6A, 7A and/or 9. The example processes of FIGS. 10 and/or 11 may be carried out by a processor, a controller and/or any other suitable processing device. For example, the example processes of FIGS. 10 and 11 may be embodied in coded instructions stored on any tangible computer-readable medium such as a flash memory, a CD, a DVD, a floppy disk, a ROM, a RAM, a programmable ROM (PROM), an electronically-programmable ROM (EPROM), an electronically-erasable PROM (EEPROM), an optical storage disk, an optical storage device, magnetic storage disk, a magnetic storage device, and/or any other medium that can be used to carry or store program code and/or instructions in the form of methods, processes or data structures, and which can be accessed by a processor, a general-purpose or special-purpose computer, or other machine with a processor (e.g., the example computing system 1900 discussed below in connection with FIG. 20). Combinations of the above are also included within the scope of computer-readable media.

Processes comprise, for example, instructions and/or data that cause a processor, a general-purpose computer, special-purpose computer, or a special-purpose processing machine to implement one or more particular processes. Alternatively, some or all of the example operations of FIGS. 10 and 11 may be implemented using any combination(s) of ASIC(s), PLD(s), FPLD(s), discreet logic, hardware, firmware, etc.

Also, one or more of the example operations of FIGS. 10 and/or 11 may be implemented using manual operations or as any combination of any of the foregoing techniques, for example, any combination of firmware, software, discreet logic and/or hardware. Further, other processes implementing the example operations of FIGS. 10 and/or 11 may be employed. For example, the order of execution of the blocks may be changed, and/or one or more of the blocks described may be changed, eliminated, sub-divided, or combined. Additionally, any or all of the example operations of FIGS. 10 and/or 11 may be carried out sequentially and/or carried out in parallel by, for example, separate processing threads, processors, devices, discreet logic, circuits, etc.

The example process 800 of FIG. 10 uses data from acoustic waveforms to image a subterranean facture including caves such as karst caves. The example process 800 emits acoustic energy, for example in the form of acoustic waveforms (block 802) by, for example, the transmitters 510, 610 described above. After the waveforms are reflected off of portions of the subterranean formation including, for example, portions of one or more fracture(s) and/or cave(s), data from the reflected waveforms is gathered (block 804) by, for example, the receivers 560, 562, 564, 566, 660, 662, 664, 666, 668 described above and sent to, for example, the input receiver 702 of the logging and control processor 50 for recordation and processing. In some examples, the data is gathered by Schlumberger's BARS (Borehole Acoustic Reflection Survey) service.

The gathered data may be processed to filter the S-S reflected waveforms (block 806) by, for example, the formation processor 704 of FIG. 9. The S-S reflected waveforms are of interest because permeable fractures or caves have strong S-S reflectivity because the fractures or caves are void or filled with water, gas and/or oil. The S-S reflected waveforms are migrated including the determination of S-S reflection points and the mapping of the data to produce a migration image (block 808) by, for example, the S-S reflected waveform migrator 710 of FIG. 9 and in accordance with, for example, the migration of S-S reflected waves process 900 of FIG. 11, which is described in greater detail below. In addition, there may be filtering of the data in the common offset domain with one or more of median filters or velocity filters.

The migration image provides useful information of the extent and the position of a fracture or other subsurface formation. A resistivity image taken from a resistivity imaging tool also provides useful information of a downhole environment and, particularly, the intersection or near proximity of subsurface formations with a well such as, for example, cracks, fractures and other features of a subterranean formation within the vicinity of the borehole wall. However, typically a resistivity image is limited in the distance from the well that the resistivity image extends. The S-S reflected waveforms penetrate deeper into the formation away from the borehole wall and provide more detailed information about the position and extent of a subsurface formation such as, for example, a fracture or a cave. Thus, in some examples the migration image is compared with or analyzed with a resistivity image to provide further understanding of the subsurface environment. For example, the resistivity image is reviewed to determine the direction of dip of a formation fracture (block 810). Caves such as karst structures are expected to be aligned with the formation dip, and the resistivity images show where permeable structures such as caves are located. In other examples, the dip direction may be determined additionally or alternatively from surface seismic, i.e., reflection seismology. Reflection seismology measurement techniques such as, for example, Schlumberger's Omega modeling systems may be used to determine information about a dip of a subsurface formation. The surface seismic estimation of the dip may occur prior to any sonic or subsurface testing.

With the dip direction known, the migration image can be used to map the caves along the dip to enable the operator or the system to identify fractures in the subterranean formation (block 812). In addition, because the S-S reflected waves penetrate deeper into the formation than the resistivity tool, the example methods described herein may be used to distinguish cracks in a borehole wall and/or diameter changes of a borehole from other subsurface formation features including, for example fractures and caves.

The example process 900 of FIG. 11 may be used by, for example, the S-S reflected wave migrator 710 of FIG. 9 to migrate the S-S reflected waves gathered by the receivers (e.g., the receivers 560, 562, 564, 566, 660, 662, 664, 666, 668 described above. In the example process 900, a dip angle of a fracture is estimated (block 902). The dip angle may be estimated, for example, using a modeling technique such as, for example, the modeling techniques discussed herein and generally with respect to FIGS. 12, 13, 14A, 14B and 15 in which various dip angles are tested or evaluated to generate synthetic waveforms. The dip angle that provides the best agreement between synthetic and recorded waveforms is selected as the estimated dip angle. The modeling techniques may take into account various known physical principles including, for example, the law of reflection, Snell's law (FIG. 8) and/or the Schoenberg slip model. The Schoenberg model is described in Schoenberg, "Elastic wave behavior across linear slip surfaces," J. Acoust. Soc. Am. 68(5), November 1980, pp. 1516-1521, which is herby incorporate by reference in its entirety.

The example migration process 900 also includes establishing a coordinate system along the well (block 904). The first axis is chosen in the direction of the well and shows the measurement depth. The second axis is chosen perpendicular to both the first axis and to the strike direction of the formation/fracture (i.e., in the direction of the dip). A small angular range for the migration aperture is established (block 906), such as, for example, less than five degrees, around the relative angle between the well and the formation/fracture. The example coordinate system and angular aperture are described in greater detail below. In addition, a CDP (common depth point) transform (i.e., mapping) be used alternative to the narrow-aperture migration to create the migration image (block 808). Migration apertures less than 2.5 degrees operate similar to the CDP mapping.

Figure 12:
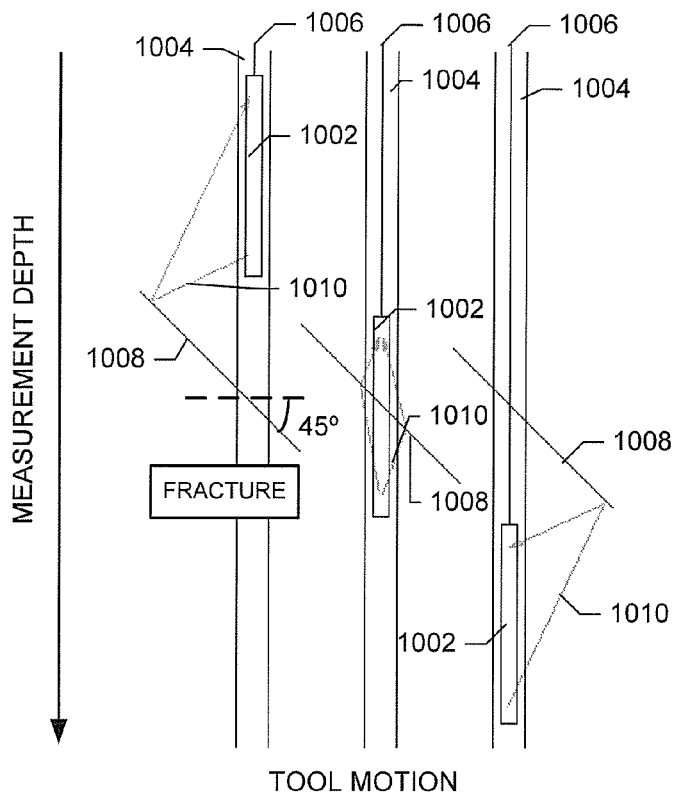
FIG. 12 is a schematic illustration of an example tool in motion.

FIG. 12 shows a schematic of an example tool 1002, which may correspond to one or more of the example tools described above. The tool 1002 is shown in three stages moving downward in a borehole 1004 along a wireline or drillstring 1006. The borehole 1004 crosses a permeable subterranean formation feature such as a fracture 1008. As the tool 1002 descends, acoustic waves 1010 are emitted from transmitters (e.g., any of the transmitters described above). The waves 1010 are reflected off of the fracture 1008 (in the direction of the arrow) and received or sensed at one or more receivers or sensors (e.g., any of the receivers described above).

Figure 13:
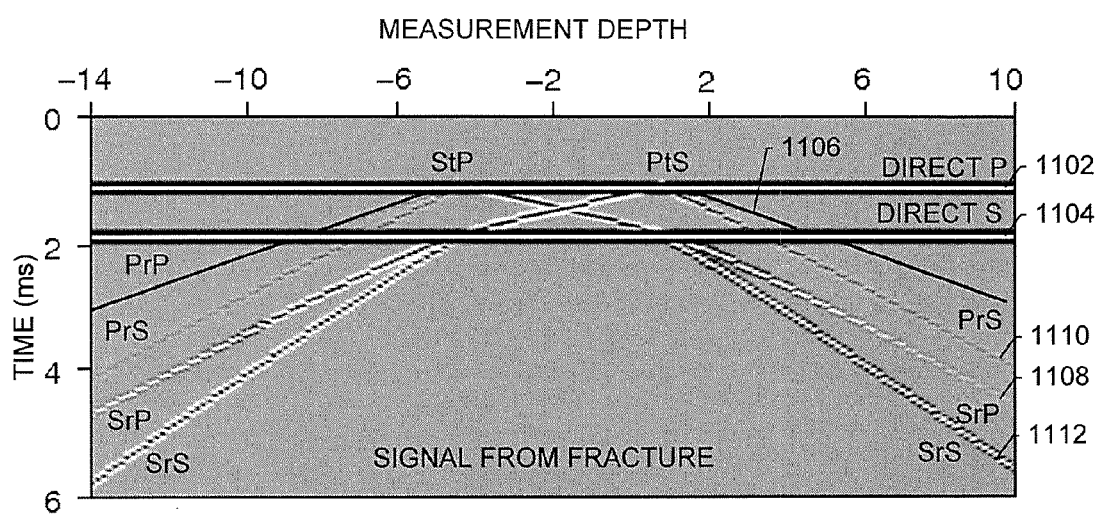
FIG. 13 is a time-distance plot (relative to a fracture) showing theoretical data.

FIG. 13 shows theoretical waveform data gathered by the receivers mapped in relation to distance from the fracture 1008, assuming the fracture has a dip of 45 degrees (which may be assumed from a previously conducted estimation of the dip). As can be seen from FIG. 13, direct P waves 1102 and direct S waves 1104 arrive first, as these waves move through the borehole directly between the transmitters and the receivers. The P-P reflected waves 1106 are relatively weak. S-P reflected waves 1108 and P-S reflected waves 1110 are relatively stronger, but the strongest wave signals are the S-S reflected waveforms 1112. Thus, the S-S reflected waves 1112 are easily observed. As noted above, the S-S reflected waves 1112 are filtered out for further processing.

Figure 14B:
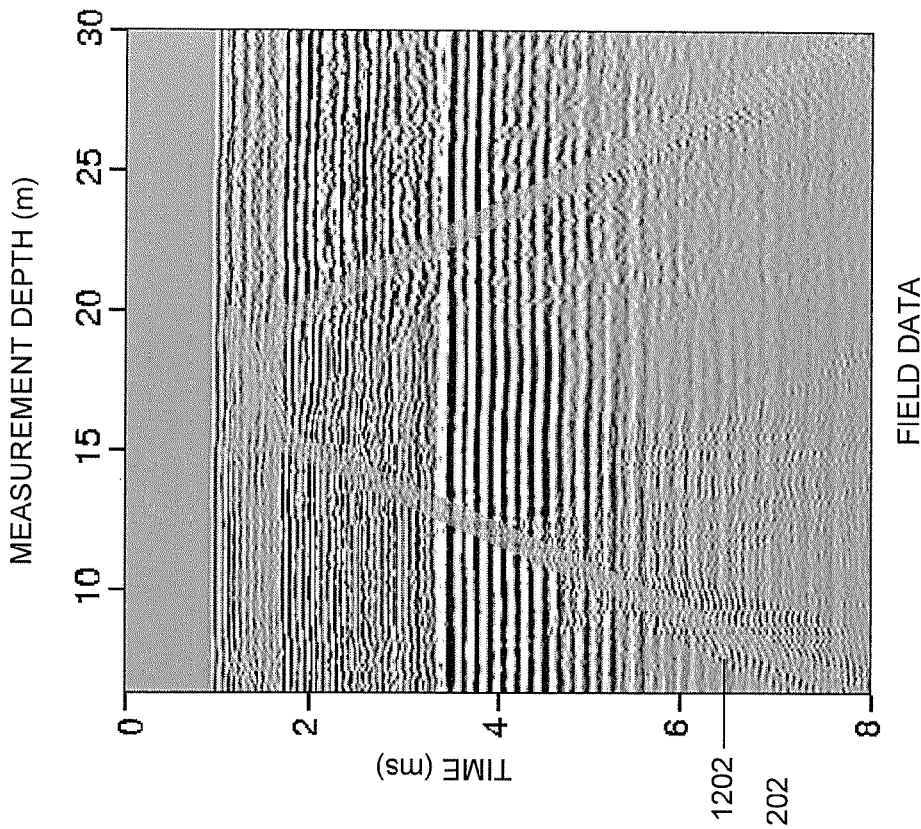
FIG. 14B shows the plot of FIG. 14A with the S-S reflected waveforms highlighted.
Figure 14A:
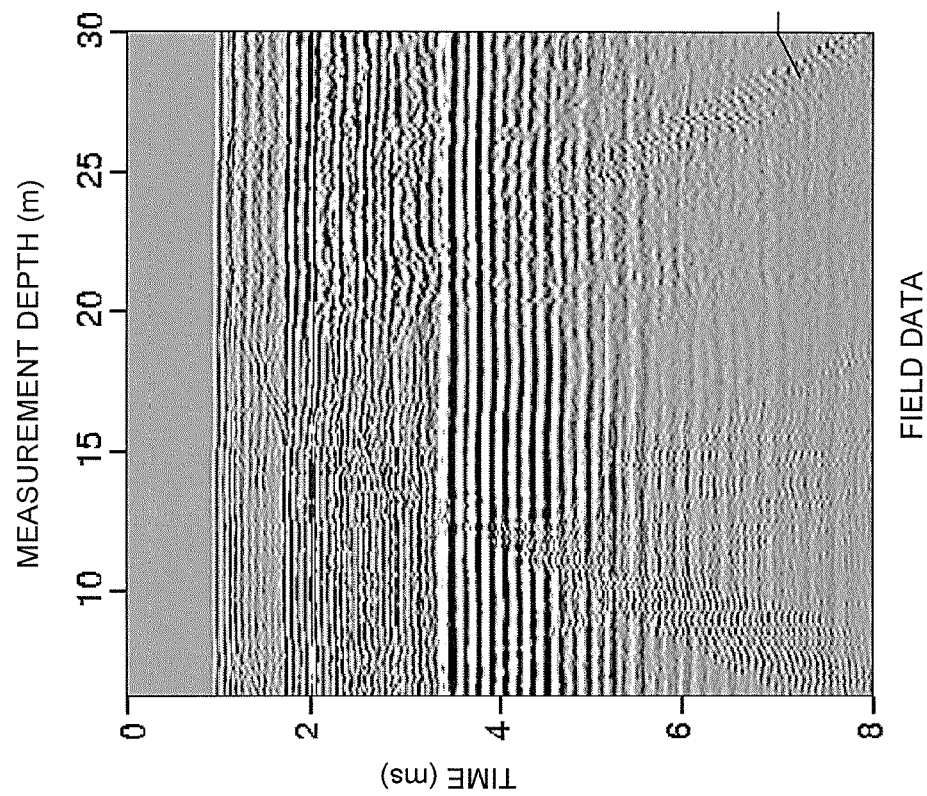
FIG. 14A is a time-distance plot (relative to a fracture) showing field data gathered using an example tool and the example methods described herein.
Figure 15:
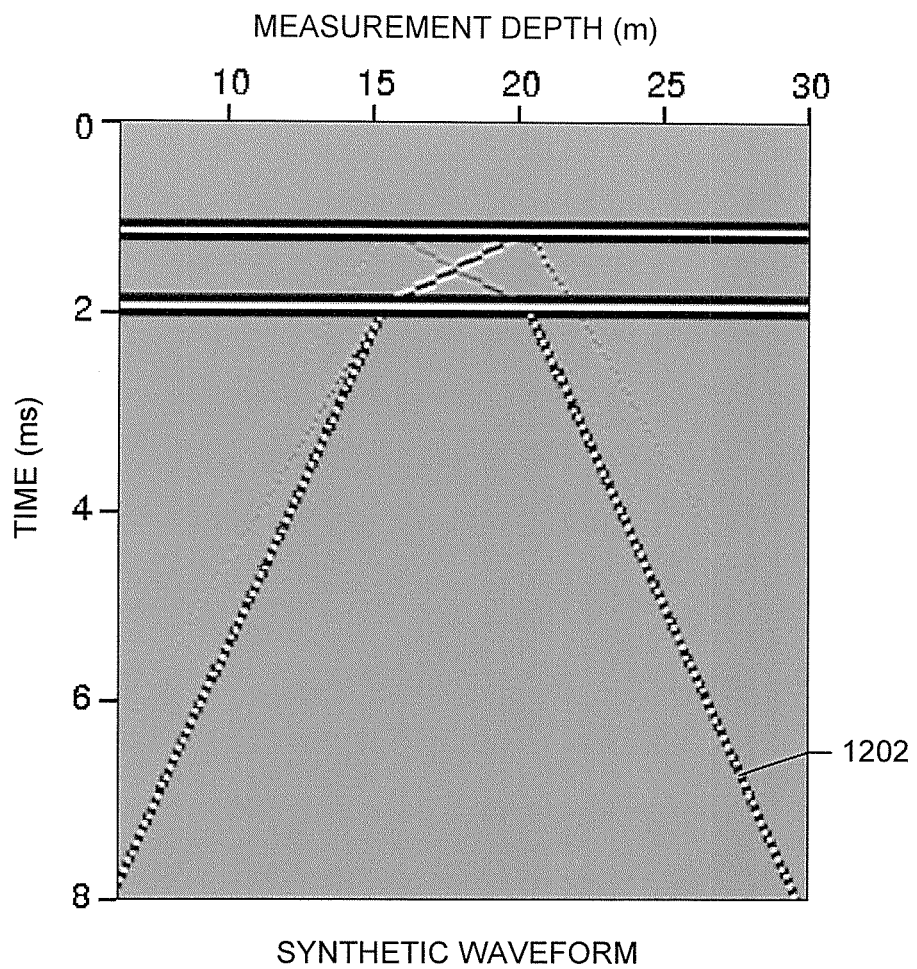
FIG. 15 shows the plot of FIG. 14A with synthetic waveforms.

FIG. 14A is a time-distance plot (relative to a fracture) showing field data gathered using an example tool and the example methods described herein. FIG. 14B shows the plot of FIG. 14A with the S-S reflected waveforms 1202 highlighted. Also, FIG. 15 shows the plot of FIG. 14A with synthetic waveforms. In FIG. 15, the S-S reflected waveforms 1202 are the most prevailing. Upon gathering this data, the dip angle is estimated (by, for example, using the modeling described above and with block 902 in FIG. 11), and the S-S reflected waves are migrated (e.g., using the S-S reflected wave migrator 710 of FIG. 9) using the processes described above.

Figure 16A:
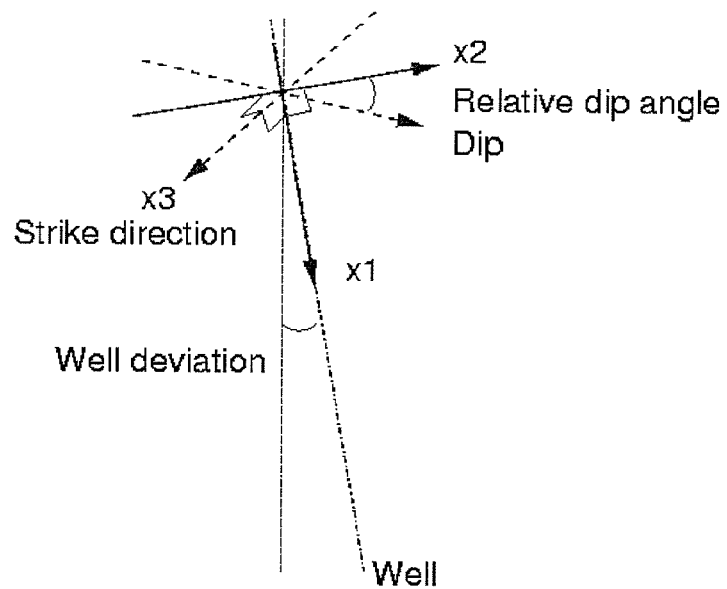
FIGS. 16A and 16B show example coordinate systems for migration.
Figure 16B:
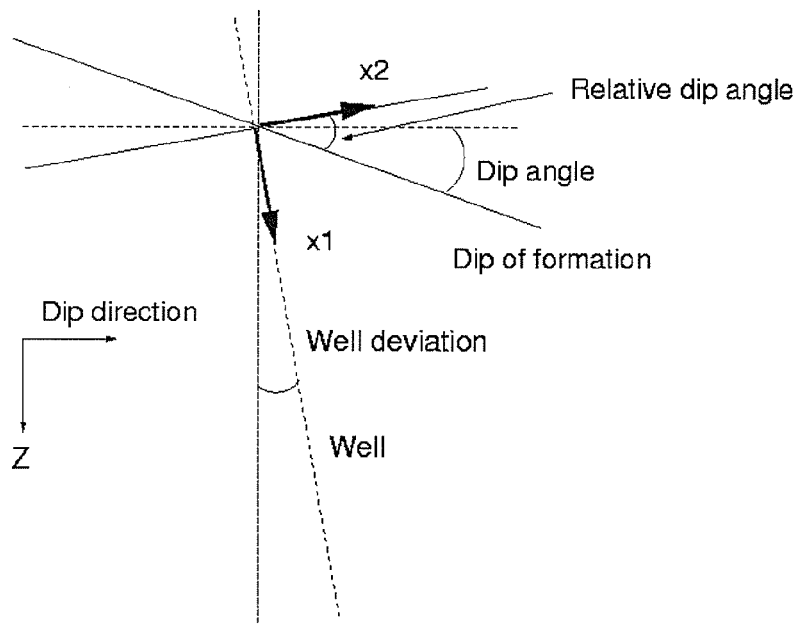

As noted above with block 906 of FIG. 11, a coordinate system is established for the migration of the S-S reflected waveforms. FIGS. 16A and 16B show example coordinate systems. FIGS. 16A and 16B show the coordinate system with the first axis, x1, established in the direction of the well, taking into account any deviation of the well. The second axis, x2, is established perpendicular to the first axis, x1, and perpendicular to the strike, x3, of the direction of the formation/fracture. The strike is of a bed, fault or other planar feature is a line representing the intersection of that feature with a horizontal plane and the dip is the angle of descent relative to that horizontal plan.

Figure 17A:
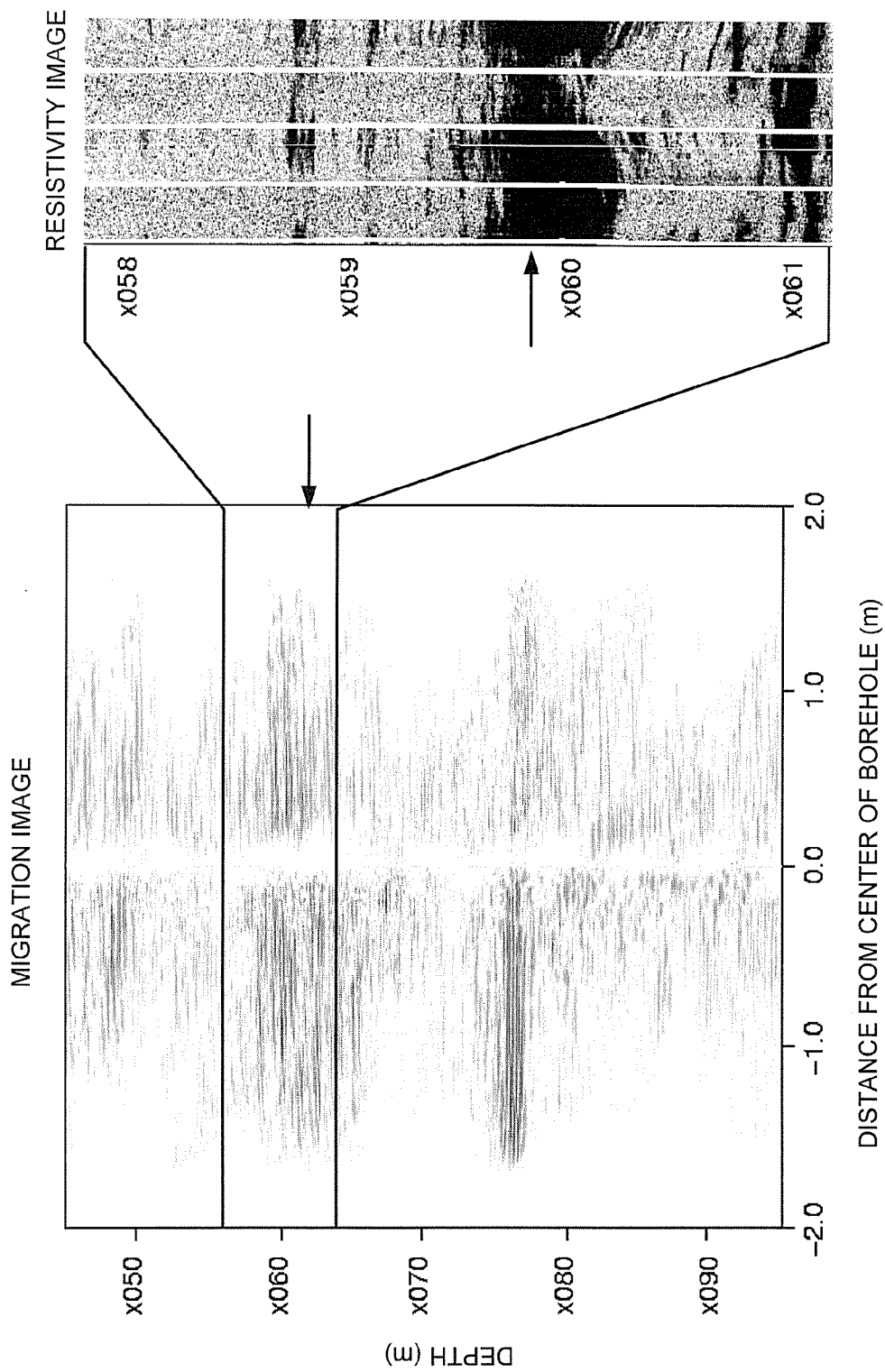
FIGS. 17A and 17B show migration images and corresponding resistivity images.
Figure 17B:
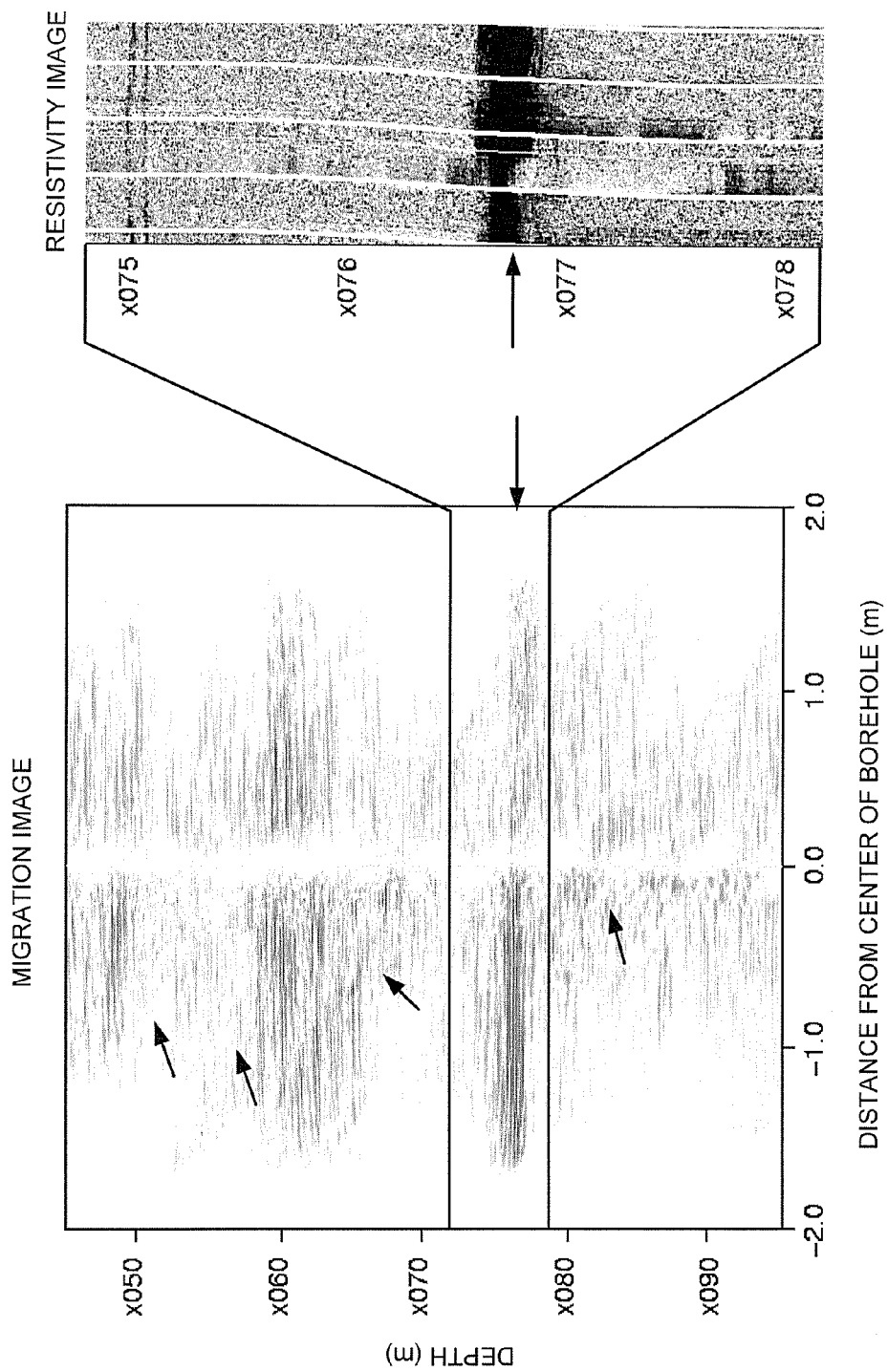

With the field data, S-S reflected waveforms, dip angle and established coordinate system, and narrow angular migration aperture, the data may be processed (by, for example, the formation processor 704 and/or S-S reflected wave migrator 710 and in accordance with the processes of FIGS. 10 and/or 11) to produce the migration images shown in FIGS. 17A and 17B (on the left of each figure). These figures also include images from a resistivity tool (on the right of each figure). The resistivity tool shows dark areas that are permeable subterranean formation features such as fractures and/or caves (e.g., karst caves). However, the resistivity tool only provides data of the formation in areas proximal to the borehole. The image from the resistivity tool may be used to indicate where on the migration image fractures and/or caves appear. Also, because the caves are expected to appear along the dip of a fracture, the fractures can be identified on the migration map with knowledge of the dip angle and the dip direction. Example fractures are identified by the arrows in FIG. 17B. In addition, as noted above, the comparison of the resistivity tool image with the migration image enables cracks in the borehole wall and/or change in the borehole diameter to be distinguished from the subsurface formations, i.e., fractures and caves.

Figure 18:
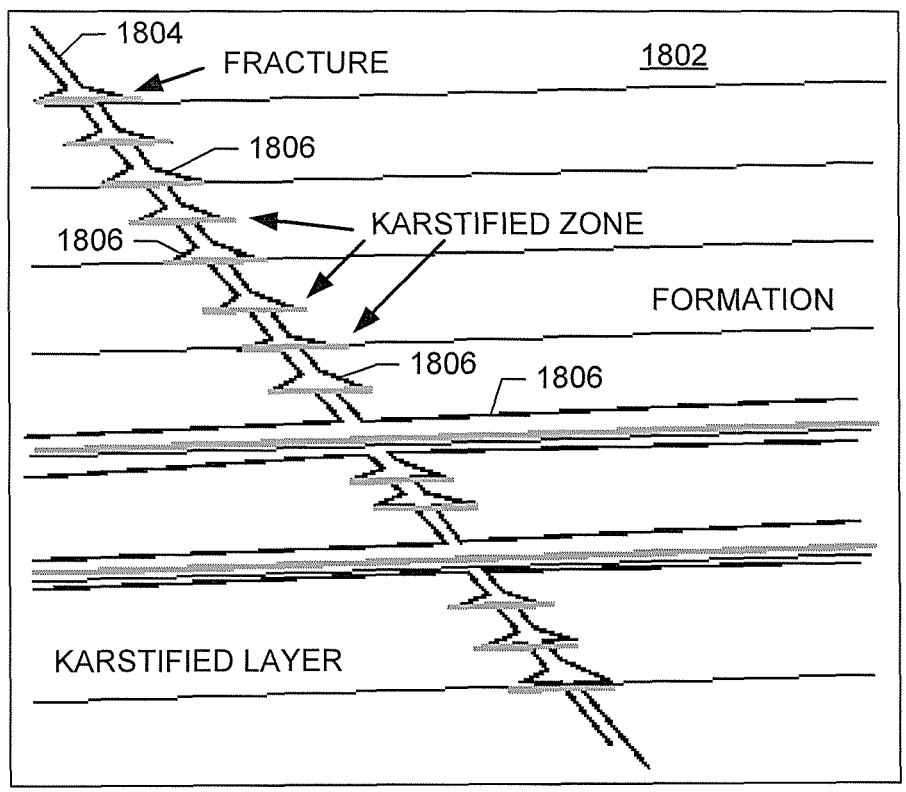
FIG. 18 depicts a schematic representation of an example fracture.

FIG. 18 schematic representation of an example fracture and caves from FIGS. 17A and 17B. As shown in FIG. 18, the formation 1802 includes a fracture 1804. A plurality of caves (karst caves) 1806 are formed along the dip of the fracture 1804.

Figure 19:
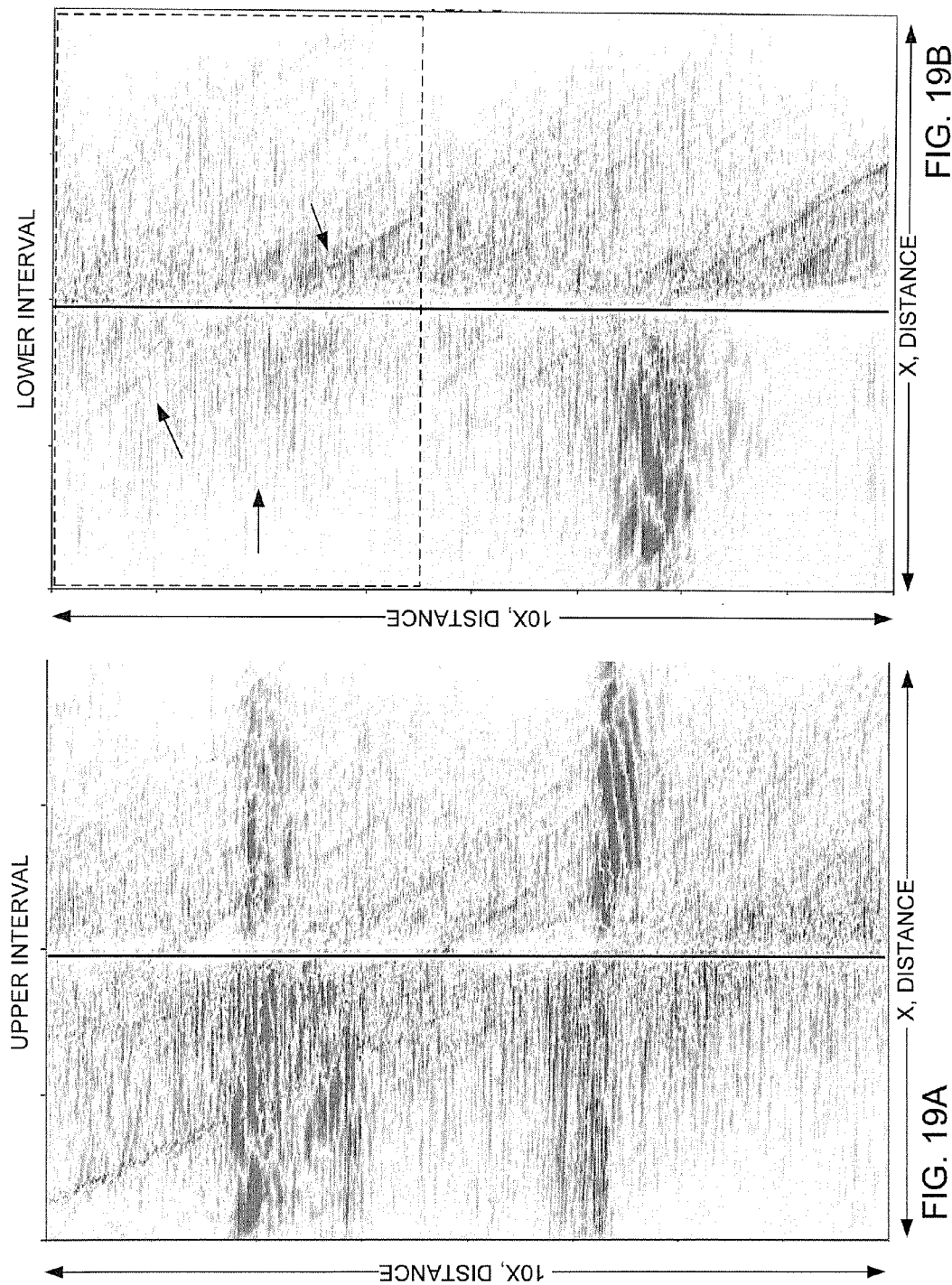
FIGS. 19A and 19B show migration images using common-depth-point mapping.

As noted above, common-depth-point (CDP) mapping may also be used with the examples described herein. In some examples CDP mapping in used as an alternative to the narrow angular migration aperture. CDP mapping may be used to conserve scattering signals and, therefore, is useful with irregular fractures, i.e., fractures with irregular or non-smooth surfaces (many of the examples described above are also applicable with smooth fractures). FIGS. 19A and 19B show migrated images in which CDP was used. FIG. 19A is an upper interval along an example vertical well and FIG. 19B is a corresponding lower interval along the well. It is assumed that scattering is dominant for a particular dip direction. Various dip directions are tested and evaluated and the dip direction that produces the best focused image is selected. The selected dip gives the dominant scattering. Fractures are identified as a set of karstified zones and are depicted by the arrows in FIG. 19D. Like the migration map, the CDP mapping may be compared with a resistivity tool image to corroborate the identification of the karst caves and fractures.

Figure 20:
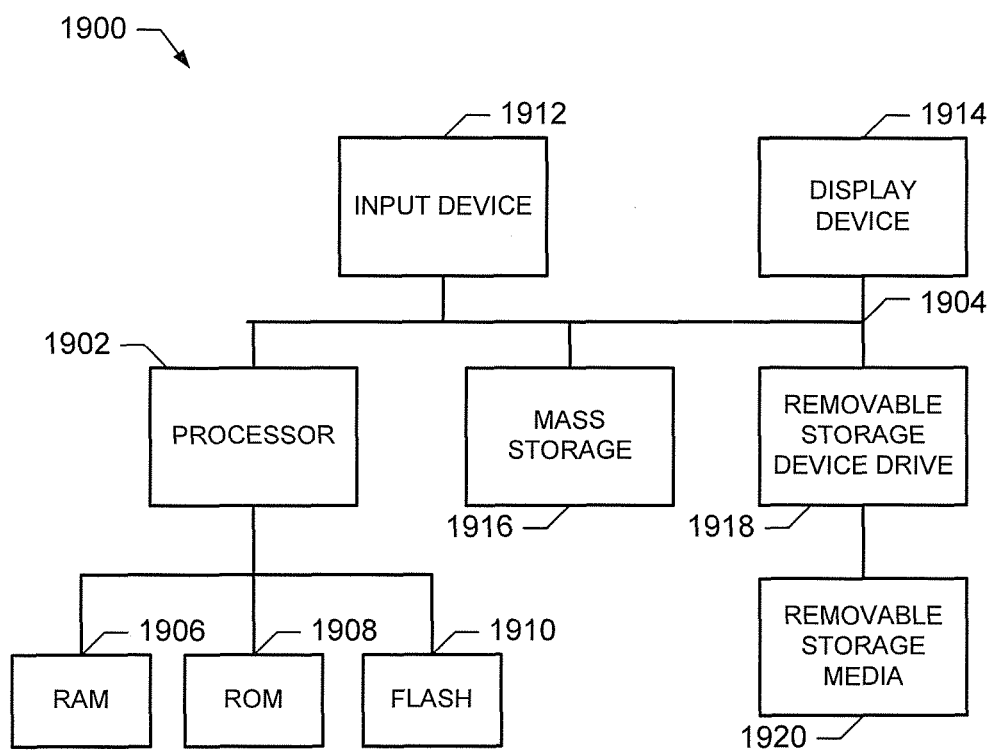
FIG. 20 is a block diagram of an example processor system that may be used to implement the example methods and apparatus described herein.

FIG. 20 is a block diagram of an example computing system 1900 that may be used to implement the example methods and apparatus described herein. For example, the computing system 1900 may be used to implement the example logging and control processor 50, the example formation processor 704, and/or the example S-S reflected wave migrator 710. The example computing system 1900 may be, for example, a conventional desktop personal computer, a notebook computer, a workstation or any other computing device. A processor 1902 may be any type of processing unit, such as a microprocessor from the Intel® Pentium® family of microprocessors, the Intel® Itanium® family of microprocessors, the Intel® Core™ family of microprocessors, and/or the Intel XScale® family of processors. Memories 1906, 1908 and 1910 that are coupled to the processor 1902 may be any suitable memory devices and may be sized to fit the storage demands of the system 1900. In particular, the flash memory 1910 may be a non-volatile memory that is accessed and erased on a block-by-block basis.

An input device 1912 may be implemented using a keyboard, a mouse, a touch screen, a track pad or any other device that enables a user to provide information to the processor 1902.

A display device 1914 may be, for example, a liquid crystal display (LCD) monitor, a cathode ray tube (CRT) monitor or any other suitable device that acts as an interface between the processor 1902 and a user. The display device 1914 as pictured in FIG. 20 includes any additional hardware required to interface a display screen to the processor 1902.

A mass storage device 1916 may be, for example, a conventional hard drive or any other magnetic or optical media that is readable by the processor 1902.

A removable storage device drive 1918 may, for example, be an optical drive, such as a compact disk-recordable (CD-R) drive, a compact disk-rewritable (CD-RW) drive, a digital versatile disk (DVD) drive or any other optical drive. It may alternatively be, for example, a magnetic media drive. A removable storage media 1920 is complimentary to the removable storage device drive 1918, inasmuch as the media 1920 is selected to operate with the drive 1918. For example, if the removable storage device drive 1918 is an optical drive, the removable storage media 1120 may be a CD-R disk, a CD-RW disk, a DVD disk or any other suitable optical disk. On the other hand, if the removable storage device drive 1918 is a magnetic media device, the removable storage media 1920 may be, for example, a diskette or any other suitable magnetic storage media.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or systems described herein.

It should also be noted that the example software and/or firmware implementations described herein are stored on a tangible storage medium, such as: a magnetic medium (e.g., a magnetic disk or tape); a magneto-optical or optical medium such as an optical disk; or a solid state medium such as a memory card or other package that houses one or more read-only (non-volatile) memories, random access memories, or other re-writable (volatile) memories. Accordingly, the example software and/or firmware described herein can be stored on a tangible storage medium such as those described above or successor storage media.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to comply with 37 C.F.R. §1.72(b) to allow the reader to quickly ascertain the nature of the technical disclosure. It is submitted with the understanding that it will not be used to interpret or limit the scope or meaning of the claims.

What is claimed is:

1. A method of acoustic subsurface imaging, the method comprising:
    generating acoustic waves with a downhole acoustic transmitter;
    receiving the acoustic waves and acoustic data contained therein at one or more downhole acoustic receivers;
    filtering for one or more S-S, P-S or S-P reflected waveform data from the acoustic data;
    estimating a dip of the one or more S-S, P-S or S-P reflected waveform data;
    migrating the one or more S-S P-S or S-P reflected waveform data with the estimated dip;
    mapping the migrated one or more S-S, P-S or S-P reflected waveform data; and
    identifying one or more permeable subsurface karst caves using the mapped migrated one or more S-S, P-S or S-P reflected waveform data.

2. A method as defined in claim 1 wherein the one or more karst caves align along the dip.

3. A method as defined in claim 2 wherein a set of karst caves aligning along the dip indicates a fracture.

4. A method as defined in claim 1 wherein the one or more permeable subsurface karst caves have at least one of strong S-S reflectivity, P-S reflectivity or S-P reflectivity.

5. A method as defined in claim 1 further comprising migrating the one or more S-S, P-S or S-P reflected waveform data with an established coordinate system.

6. A method as defined in claim 5 wherein the coordinate system includes a first axis defined in the direction of a borehole and a second axis perpendicular to the first axis and perpendicular to a strike of one of the permeable subsurface karst caves.

7. A method as defined in claim 1 further comprising migrating the one or more S-S P-S or S-P reflected waveform data with a relative dip angle between a well and the dip of the one or more subsurface formation features.

8. A method as defined in claim 1 further comprising migrating the one or more S-S, P-S or S-P reflected waveform data with a dip aperture that is about five degrees or less.

9. A method as defined in claim 1 further comprising migrating the one or more S-S, P-S or S-P reflected waveform data with common-depth-point mapping.

10. A method as defined in claim 1 further comprising filtering the data in the common offset domain with one or more of a median filter or a velocity filter.

11. An apparatus for acoustic subsurface imaging, the apparatus comprising:
    one or more downhole acoustic transmitters to generate acoustic waves;
    one or more downhole acoustic receivers to sense the acoustic waves and acoustic data contained therein;
    a filter to extract one or more S-S, P-S or S-P reflected waveform data from the acoustic data; and
    a processor configured to:
        estimate a dip of the one or more S-S, P-S or S-P reflected waveform data,
        migrate the one or more S-S, P-S or S-P reflected waveform data with the estimated dip;

map the migrated one or more S-S, P-S or S-P reflected waveform data; and identify one or more permeable subsurface karst caves based on the map of the migrated one or more S-S, P-S or S-S reflected waveform data and at least one resistivity image.

12. An apparatus as defined in claim 11 wherein the one or more karst caves align along the dip.

13. An apparatus as defined in claim 12 wherein a set of karst caves aligning along the dip indicates a fracture.

14. An apparatus as defined in claim 11 wherein the processor is further configured to distinguish the one or more permeable subsurface karst caves from a crack in a borehole wall by comparing the at least one resistivity image to the map of the migrated one or more S-S, P-S or S-S reflected waveform data.

15. An apparatus as defined in claim 11 wherein the processor is further configured to distinguish the one or more permeable subsurface karst caves from a change in a borehole diameter by comparing the at least one resistivity image to the map of the migrated one or more S-S, P-S or S-S reflected waveform data.

16. An apparatus as defined in claim 11 wherein the one or more permeable subsurface karst caves have at least one of strong S-S reflectivity, P-S reflectivity or S-P reflectivity.

17. An apparatus as defined in claim 11 wherein the processor is further configured to migrate the one or more S-S, P-S or S-P reflected waveform data with an established coordinate system.

18. An apparatus as defined in claim 17 wherein the coordinate system includes a first axis defined in the direction of a borehole and a second axis perpendicular to the first axis and perpendicular to a strike of one of the permeable subsurface karst caves.

19. An apparatus as defined in claim 11 wherein the processor is further configured to migrate the one or more S-S, P-S or S-P reflected waveform data with a relative dip angle between a well and the dip of the one or more S-S, P-S or S-P reflected waveform data.

20. An apparatus as defined in claim 11 wherein the processor is further configured to migrate the one or more S-S, P-S or S-P reflected waveform data with a dip aperture that is about five degrees or less.

21. An apparatus as defined in claim 11 wherein the processor is further configured to migrate the one or more S-S, P-S or S-P reflected waveform data with common-depth-point mapping.

22. An apparatus as defined in claim 11 wherein the filter or a second filter is to filter the data in the common offset domain with one or more of a median filter or a velocity filter.

23. A method for imaging subsurface karst caves, the method comprising:

receiving acoustic waves at one or more depths of a borehole traversing a subsurface formation, the formation having a strike and a dip;

recording waveform data based on the acoustic waves; filtering to extract one or more S-S, P-S or S-P reflected waveform from the recorded waveform data;

processing the one or more S-S, S-P or P-S reflected waveform data to determine one or more an S-S, P-S or S-P reflection point for a feature of interest; and imaging the subsurface karst caves using the one or more S-S, P-S or S-P reflection point, wherein the processing includes:

providing a coordinate system having a first axis along the borehole, a second axis perpendicular to the first axis and the strike, and a relative dip angle between the borehole and the dip; and performing a migration of the one or more S-S, P-S or S-P reflected waves by using at least one of a narrow dip aperture around the relative dip angle or a common depth point transform for the relative dip angle.

24. The method of claim 23, wherein the S-S reflected waves appear more dominant in the waveform data than each of the P-P reflected waves, the P-S reflected waves and the S-P reflected waves.

* * * * *